US012050887B2

United States Patent
Chen et al.

(10) Patent No.: US 12,050,887 B2
(45) Date of Patent: Jul. 30, 2024

(54) INFORMATION PROCESSING METHOD AND TERMINAL DEVICE

(71) Applicant: Shanghai Cambricon Information Technology Co., Ltd., Pudong New Area (CN)

(72) Inventors: Tianshi Chen, Pudong New Area (CN); Shaoli Liu, Pudong New Area (CN); Zai Wang, Pudong New Area (CN); Shuai Hu, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 675 days.

(21) Appl. No.: 17/119,029

(22) Filed: Dec. 11, 2020

(65) Prior Publication Data
US 2021/0157992 A1    May 27, 2021

Related U.S. Application Data

(63) Continuation of application No. 16/760,235, filed as application No. PCT/CN2018/105463 on Sep. 13, 2018.

(51) Int. Cl.
*G06F 40/58* (2020.01)
*G06F 7/544* (2006.01)
(Continued)

(52) U.S. Cl.
CPC .......... *G06F 7/5443* (2013.01); *G06F 9/3001* (2013.01); *G06F 9/445* (2013.01);
(Continued)

(58) Field of Classification Search
CPC ........ G06F 7/5443; G06F 17/10; G06F 7/544; G06F 9/3001; G06F 9/30; G06F 21/57;
(Continued)

(56) References Cited

U.S. PATENT DOCUMENTS 5,047,954 A    9/1991 Corona et al.
5,283,839 A    2/1994 Edelman et al.
(Continued)

FOREIGN PATENT DOCUMENTS

CA    2317593 C    6/2009
CN    85109589 A    6/1986
(Continued)

OTHER PUBLICATIONS

CN201811436410.5, Chinese Office Action Issued Apr. 30, 2020, 7 pages, No English Translation.
(Continued)

*Primary Examiner* — Huyen X Vo
(74) *Attorney, Agent, or Firm* — Getech Law LLC; Jun Ye

(57) ABSTRACT

Disclosed are an information processing method and a terminal device. The method comprises: acquiring first information, wherein the first information is information to be processed by a terminal device; calling an operation instruction in a calculation apparatus to calculate the first information so as to obtain second information; and outputting the second information. By means of the examples in the present disclosure, a calculation apparatus of a terminal device can be used to call an operation instruction to process first information, so as to output second information of a target desired by a user, thereby improving the information processing efficiency. The present technical solution has advantages of a fast computation speed and high efficiency.

13 Claims, 10 Drawing Sheets

(51) Int. Cl.
| | |
|---|---|
| *G06F 9/30* | (2018.01) |
| *G06F 9/445* | (2018.01) |
| *G06F 40/263* | (2020.01) |
| *G06N 3/02* | (2006.01) |
| *G06N 3/04* | (2023.01) |
| *G06N 3/08* | (2023.01) |
| *G06T 1/20* | (2006.01) |
| *G06T 1/60* | (2006.01) |
| *G06T 3/4046* | (2024.01) |
| *G06T 3/4053* | (2024.01) |
| *G06T 5/20* | (2006.01) |
| *G06T 5/50* | (2006.01) |
| *G06T 7/20* | (2017.01) |
| *G06V 10/70* | (2022.01) |
| *G06V 10/82* | (2022.01) |
| *G06V 10/94* | (2022.01) |
| *G10L 15/00* | (2013.01) |
| *G06N 3/063* | (2023.01) |
| *G06N 3/082* | (2023.01) |
| *G06N 3/084* | (2023.01) |

(52) U.S. Cl.
CPC ............ *G06F 40/263* (2020.01); *G06F 40/58* (2020.01); *G06N 3/02* (2013.01); *G06N 3/04* (2013.01); *G06N 3/08* (2013.01); *G06T 1/20* (2013.01); *G06T 1/60* (2013.01); *G06T 3/4046* (2013.01); *G06T 3/4053* (2013.01); *G06T 5/20* (2013.01); *G06T 5/50* (2013.01); *G06T 7/20* (2013.01); *G06V 10/70* (2022.01); *G06V 10/82* (2022.01); *G06V 10/94* (2022.01); *G10L 15/00* (2013.01); *G06N 3/063* (2013.01); *G06N 3/082* (2013.01); *G06N 3/084* (2013.01); *G06T 2207/10016* (2013.01); *G06T 2207/20084* (2013.01); *G06V 2201/07* (2022.01)

(58) Field of Classification Search
CPC ........ G06F 9/445; G06F 40/263; G06F 40/58; G06F 18/00; G06F 40/42; G06F 2207/4824; H03H 17/00; G06N 3/02; G06N 3/04; G06N 3/08; G06N 3/063; G06N 3/082; G06N 3/084; G06N 3/044; G06N 3/045; G06T 1/20; G06T 1/60; G06T 3/4046; G06T 3/40; G06T 3/4053; G06T 5/20; G06T 5/50; G06T 7/20; G06T 2207/10016; G06T 2207/20084; G06V 10/70; G06V 10/82; G06V 10/94; G06V 2201/07; G10L 17/00; G10L 15/00; G06Q 30/0241; G06Q 30/0282
See application file for complete search history.

(56) References Cited

U.S. PATENT DOCUMENTS

| | | | |
|---|---|---|---|
| 6,047,081 A | 4/2000 | Groezinger et al. | |
| 6,477,555 B1 | 11/2002 | Hartung | |
| 6,954,509 B2 | 10/2005 | Bohnhoff et al. | |
| 7,065,545 B2 | 6/2006 | Quintero-De-La-Garza | |
| 8,200,726 B2 | 6/2012 | Gunnels et al. | |
| 8,706,971 B1 | 4/2014 | Nayak | |
| 9,094,576 B1 | 7/2015 | Karakotsios | |
| 9,430,164 B1 | 8/2016 | Botelho et al. | |
| 9,542,626 B2 | 1/2017 | Martinson et al. | |
| 9,542,933 B2 | 1/2017 | Mortensen | |
| 9,824,684 B2 | 11/2017 | Yu et al. | |
| 9,864,933 B1 | 1/2018 | Cosic | |
| 9,959,272 B1* | 5/2018 | Canek et al. | G06F 40/58 |
| 10,032,463 B1 | 7/2018 | Rastrow et al. | |
| 10,467,201 B1 | 11/2019 | Merritt et al. | |
| 10,664,963 B1 | 5/2020 | Rossi et al. | |
| 11,113,578 B1 | 9/2021 | Brandt et al. | |
| 2002/0015326 A1 | 2/2002 | Rolandi et al. | |
| 2003/0208664 A1 | 11/2003 | Singh | |
| 2005/0149465 A1 | 7/2005 | Nugent | |
| 2006/0110068 A1 | 5/2006 | Luo et al. | |
| 2007/0061550 A1 | 3/2007 | Barlow et al. | |
| 2007/0156685 A1 | 7/2007 | Inoue et al. | |
| 2008/0208597 A1 | 8/2008 | Chino et al. | |
| 2008/0243279 A1 | 10/2008 | Sherman | |
| 2009/0113180 A1 | 4/2009 | Banerjee et al. | |
| 2011/0040821 A1 | 2/2011 | Eichenberger et al. | |
| 2011/0112981 A1 | 5/2011 | Park et al. | |
| 2011/0135167 A1 | 6/2011 | Imaoka | |
| 2011/0153707 A1 | 6/2011 | Ginzburg et al. | |
| 2011/0193876 A1 | 8/2011 | Handa et al. | |
| 2011/0292062 A1 | 12/2011 | Hirotani | |
| 2012/0054311 A1 | 3/2012 | Mizuno et al. | |
| 2012/0216188 A1 | 8/2012 | Tsirkin | |
| 2014/0233820 A1 | 8/2014 | Wu et al. | |
| 2014/0257813 A1 | 9/2014 | Mortensen | |
| 2014/0281386 A1 | 9/2014 | Fox et al. | |
| 2014/0281406 A1 | 9/2014 | Dixon et al. | |
| 2014/0337989 A1* | 11/2014 | Orsini | H04L 51/212 726/26 |
| 2015/0060060 A1 | 3/2015 | Colvin et al. | |
| 2015/0269119 A1 | 9/2015 | Derby et al. | |
| 2015/0370559 A1 | 12/2015 | Gschwind et al. | |
| 2016/0078863 A1 | 3/2016 | Chung et al. | |
| 2016/0125253 A1 | 5/2016 | Visvanathan et al. | |
| 2016/0188725 A1 | 6/2016 | Wang et al. | |
| 2016/0342418 A1 | 11/2016 | Galoppo Von Borries et al. | |
| 2016/0378661 A1 | 12/2016 | Gray et al. | |
| 2017/0083965 A1 | 3/2017 | Sun | |
| 2017/0103311 A1 | 4/2017 | Henry et al. | |
| 2017/0139713 A1 | 5/2017 | Gschwind et al. | |
| 2017/0177348 A1 | 6/2017 | Ould-Ahmed-Vall et al. | |
| 2017/0193368 A1 | 7/2017 | Joseph et al. | |
| 2017/0193397 A1 | 7/2017 | Deshmukh et al. | |
| 2017/0194001 A1 | 7/2017 | Mortensen | |
| 2017/0200067 A1 | 7/2017 | Zhou et al. | |
| 2017/0206227 A1 | 7/2017 | Hwang et al. | |
| 2017/0262284 A1 | 9/2017 | Bradbury et al. | |
| 2017/0337657 A1 | 11/2017 | Cornell | |
| 2018/0068463 A1 | 3/2018 | Risser | |
| 2018/0082172 A1 | 3/2018 | Patel et al. | |
| 2018/0136912 A1 | 5/2018 | Venkataramani et al. | |
| 2018/0150947 A1 | 5/2018 | Lu et al. | |
| 2018/0189580 A1 | 7/2018 | Lee et al. | |
| 2018/0240257 A1 | 8/2018 | Li et al. | |
| 2018/0300850 A1 | 10/2018 | Johnson et al. | |
| 2018/0315165 A1 | 11/2018 | Navarrete Michelini et al. | |
| 2018/0336464 A1 | 11/2018 | Karras et al. | |
| 2018/0350030 A1 | 12/2018 | Simons et al. | |
| 2019/0005383 A1 | 1/2019 | Kantor et al. | |
| 2019/0050723 A1* | 2/2019 | Kong | G06N 3/08 |
| 2019/0079999 A1* | 3/2019 | Min | G06N 3/08 |
| 2019/0080165 A1 | 3/2019 | Takahashi et al. | |
| 2019/0138922 A1 | 5/2019 | Liu et al. | |
| 2019/0139191 A1 | 5/2019 | Liu et al. | |
| 2019/0188567 A1 | 6/2019 | Yao et al. | |
| 2019/0236814 A1 | 8/2019 | Shlens et al. | |
| 2020/0193225 A1 | 6/2020 | Olmeda Reino et al. | |
| 2020/0250539 A1 | 8/2020 | Liu et al. | |
| 2021/0097326 A1 | 4/2021 | Chen et al. | |
| 2021/0182077 A1 | 6/2021 | Chen et al. | |
| 2021/0182666 A1 | 6/2021 | Han et al. | |
| 2021/0192245 A1 | 6/2021 | Chen et al. | |
| 2021/0209448 A1 | 7/2021 | Navarrete Michelini et al. | |
| 2022/0058772 A1 | 2/2022 | Chuang et al. | |

FOREIGN PATENT DOCUMENTS

| | | |
|---|---|---|
| CN | 101072166 A | 11/2007 |
| CN | 101078985 A | 11/2007 |
| CN | 101084485 A | 12/2007 |
| CN | 101187861 A | 5/2008 |
| CN | 101208898 A | 6/2008 |

(56) References Cited

FOREIGN PATENT DOCUMENTS

| | | |
|---|---|---|
| CN | 101295405 A | 10/2008 |
| CN | 101315770 A | 12/2008 |
| CN | 101340585 A | 1/2009 |
| CN | 101369233 A | 2/2009 |
| CN | 101515998 A | 8/2009 |
| CN | 101556565 A | 10/2009 |
| CN | 101615113 A | 12/2009 |
| CN | 101617311 A | 12/2009 |
| CN | 101620524 A | 1/2010 |
| CN | 101685388 A | 3/2010 |
| CN | 101779434 A | 7/2010 |
| CN | 101794239 A | 8/2010 |
| CN | 101819570 A | 9/2010 |
| CN | 101833441 A | 9/2010 |
| CN | 101833468 A | 9/2010 |
| CN | 101876892 A | 11/2010 |
| CN | 101944067 A | 1/2011 |
| CN | 102004628 A | 4/2011 |
| CN | 102005743 A | 4/2011 |
| CN | 102012893 A | 4/2011 |
| CN | 102014475 A | 4/2011 |
| CN | 102098623 A | 6/2011 |
| CN | 102103479 A | 6/2011 |
| CN | 101315770 A | 1/2012 |
| CN | 102346894 A | 2/2012 |
| CN | 102360344 A | 2/2012 |
| CN | 102375805 A | 3/2012 |
| CN | 102508643 A | 6/2012 |
| CN | 102520906 A | 6/2012 |
| CN | 102541814 A | 7/2012 |
| CN | 102724482 A | 10/2012 |
| CN | 102750127 A | 10/2012 |
| CN | 102831387 A | 12/2012 |
| CN | 102880341 A | 1/2013 |
| CN | 103002147 A | 3/2013 |
| CN | 103064086 A | 4/2013 |
| CN | 103238133 A | 8/2013 |
| CN | 103294648 A | 9/2013 |
| CN | 103309813 A | 9/2013 |
| CN | 103368701 A | 10/2013 |
| CN | 103502935 A | 1/2014 |
| CN | 103530276 A | 1/2014 |
| CN | 103646007 A | 3/2014 |
| CN | 103646009 A | 3/2014 |
| CN | 103699360 A | 4/2014 |
| CN | 103856727 A | 6/2014 |
| CN | 103874964 A | 6/2014 |
| CN | 103975302 A | 8/2014 |
| CN | 103999037 A | 8/2014 |
| CN | 104011649 A | 8/2014 |
| CN | 104011651 A | 8/2014 |
| CN | 104038864 A | 9/2014 |
| CN | 104040482 A | 9/2014 |
| CN | 104077138 A | 10/2014 |
| CN | 104081337 A | 10/2014 |
| CN | 104094182 A | 10/2014 |
| CN | 104123250 A | 10/2014 |
| CN | 104157285 A | 11/2014 |
| CN | 104169907 B | 11/2014 |
| CN | 104219505 A | 12/2014 |
| CN | 104350492 A | 2/2015 |
| CN | 104376326 A | 2/2015 |
| CN | 104376842 A | 2/2015 |
| CN | 104423926 A | 3/2015 |
| CN | 104461970 A | 3/2015 |
| CN | 104537630 A | 4/2015 |
| CN | 104583938 A | 4/2015 |
| CN | 104850845 A | 8/2015 |
| CN | 104915322 A | 9/2015 |
| CN | 104937542 A | 9/2015 |
| CN | 104937543 A | 9/2015 |
| CN | 104956323 A | 9/2015 |
| CN | 105068998 A | 11/2015 |
| CN | 105069304 A | 11/2015 |
| CN | 105094749 A | 11/2015 |
| CN | 105122228 A | 12/2015 |
| CN | 105160340 A | 12/2015 |
| CN | 105354006 A | 2/2016 |
| CN | 105405443 A | 3/2016 |
| CN | 105446970 A | 3/2016 |
| CN | 105468335 A | 4/2016 |
| CN | 105468546 A | 4/2016 |
| CN | 105488565 A | 4/2016 |
| CN | 105512676 A | 4/2016 |
| CN | 105512723 A | 4/2016 |
| CN | 105609141 A | 5/2016 |
| CN | 105703978 A | 6/2016 |
| CN | 105719327 A | 6/2016 |
| CN | 105721354 A | 6/2016 |
| CN | 105787888 A | 7/2016 |
| CN | 105830040 A | 8/2016 |
| CN | 105849690 A | 8/2016 |
| CN | 105869024 A | 8/2016 |
| CN | 105869117 A | 8/2016 |
| CN | 105892989 A | 8/2016 |
| CN | 105895082 A | 8/2016 |
| CN | 105912667 A | 8/2016 |
| CN | 105913039 A | 8/2016 |
| CN | 105930902 A | 9/2016 |
| CN | 105956608 A | 9/2016 |
| CN | 205582481 U | 9/2016 |
| CN | 106022468 A | 10/2016 |
| CN | 106067031 A | 11/2016 |
| CN | 106095834 A | 11/2016 |
| CN | 106096542 A | 11/2016 |
| CN | 106126507 A | 11/2016 |
| CN | 106127672 A | 11/2016 |
| CN | 106228512 A | 12/2016 |
| CN | 106296667 A | 1/2017 |
| CN | 106302837 A | 1/2017 |
| CN | 106328127 A | 1/2017 |
| CN | 106408086 A | 2/2017 |
| CN | 106408595 A | 2/2017 |
| CN | 106484682 A | 3/2017 |
| CN | 106503055 A | 3/2017 |
| CN | 106548208 A | 3/2017 |
| CN | 104169907 B | 4/2017 |
| CN | 106560809 A | 4/2017 |
| CN | 106575219 A | 4/2017 |
| CN | 106604216 A | 4/2017 |
| CN | 106650581 A | 5/2017 |
| CN | 106650922 A | 5/2017 |
| CN | 106709532 A | 5/2017 |
| CN | 106778472 A | 5/2017 |
| CN | 106778928 A | 5/2017 |
| CN | 106780367 A | 5/2017 |
| CN | 106782501 A | 5/2017 |
| CN | 106815321 A | 6/2017 |
| CN | 106844627 A | 6/2017 |
| CN | 106845549 A | 6/2017 |
| CN | 106850673 A | 6/2017 |
| CN | 106887225 A | 6/2017 |
| CN | 106898350 A | 6/2017 |
| CN | 106898353 A | 6/2017 |
| CN | 106920545 B | 7/2017 |
| CN | 106951961 A | 7/2017 |
| CN | 106952224 A | 7/2017 |
| CN | 106952235 A | 7/2017 |
| CN | 106970896 A | 7/2017 |
| CN | 106990940 A | 7/2017 |
| CN | 106991077 A | 7/2017 |
| CN | 106991476 A | 7/2017 |
| CN | 106991477 A | 7/2017 |
| CN | 106991478 A | 7/2017 |
| CN | 107003843 A | 8/2017 |
| CN | 107038159 A | 8/2017 |
| CN | 107067825 A | 8/2017 |
| CN | 107111486 A | 8/2017 |
| CN | 107133018 A | 9/2017 |
| CN | 107169503 A | 9/2017 |
| CN | 107171932 A | 9/2017 |
| CN | 107194938 A | 9/2017 |
| CN | 107203775 A | 9/2017 |
| CN | 107221337 A | 9/2017 |

(56) References Cited

FOREIGN PATENT DOCUMENTS

| | | |
|---|---|---|
| CN | 107239824 A | 10/2017 |
| CN | 107240185 A | 10/2017 |
| CN | 107247930 A | 10/2017 |
| CN | 107301383 A | 10/2017 |
| CN | 107301453 A | 10/2017 |
| CN | 107301454 A | 10/2017 |
| CN | 107305484 A | 10/2017 |
| CN | 106447034 B | 7/2019 |
| CN | 106920545 B | 7/2020 |
| EP | 0097858 B1 | 12/1991 |
| EP | 0475732 B1 | 12/1998 |
| EP | 2851786 A1 | 3/2015 |
| GB | 2515145 B | 12/2015 |
| IN | 106529668 A | 3/2017 |
| JP | 2006031475 A | 2/2006 |
| WO | 2005086443 A1 | 9/2005 |
| WO | 2010064728 A1 | 6/2010 |
| WO | 2014105123 A1 | 7/2014 |
| WO | 2017021322 A1 | 2/2017 |
| WO | 2017027638 A1 | 2/2017 |
| WO | 2017048647 A1 | 3/2017 |
| WO | 2017077121 A1 | 5/2017 |
| WO | 2017084331 A1 | 5/2017 |
| WO | 2017124648 A1 | 7/2017 |

OTHER PUBLICATIONS

CN201811440571.1, Chinese Office Action Issued Apr. 30, 2020, 31 pages, No English Translation.
CN201811440571.1, Chinese Office Action Issued Nov. 4, 2020, 5 pages, No English Translation.
PCT/CN2018/105463, International Search Report Issued Dec. 3, 2018, 9 pages, No English Translation.
CN201910070501.X, Chinese Office Action Issued Oct. 29, 2020, 3 pages, No English Translation.
CN201910070501.X, Chinese Office Action Issued Nov. 5, 2020, 16 pages, No English Translation.
CN201910067288.7, Chinese Office Action Issued Oct. 29, 2020, 11 pages, No English Translation.
CN201910067288.7, Chinese Office Action Issued May 5, 2020, 14 pages, No English Translation.
CN201711212125.0, Chinese Office Action Issued Dec. 16, 2020, 50 pages, No English Translation.
CN201711212122.7, Chinese Office Action Issued Jul. 17, 2020, 14 pages, No English Translation.
CN201711212123.1, Chinese Office Action Issued May 21, 2020, 14 pages, No English Translation.
CN201711212123.1, Chinese Office Action Issued Nov. 26, 2019, 15 pages, No English Translation.
CN201711212660.6, Chinese Office Action Issued Dec. 16, 2020, 16 pages, No English Translation.
CN201711211933.5, Chinese Office Action Issued Dec. 16, 2020, 28 pages, No English Translation.
CN201711212991.X, Chinese Office Action Issued Dec. 7, 2020, 14 pages, No English Translation.
CN201711212991.X, Chinese Office Action Issued Aug. 26, 2020, 5 pages, No English Translation.
CN201711212995.8, Chinese Office Action Issued Jun. 28, 2020, 10 pages, No English Translation.
CN201711212995.8, Chinese Office Action Issued Nov. 27, 2020, 8 pages, No English Translation.
CN201711212656.X, Chinese Office Action Issued Jun. 28, 2020, 10 pages, No English Translation.
CN201711212656.X, Chinese Office Action Issued Nov. 27, 2019, 8 pages, No English Translation.
CN201711212994.3, Chinese Office Action Issued Nov. 20, 2020, 41 pages, No English Translation.
CN201810801239.7, Chinese Office Action Issued Apr. 29, 2020, 32 pages, No English Translation.
CN201810801239.7, Chinese Office Action Issued Oct. 16, 2020, 7 pages, No English Translation.
CN201810801236.3, Chinese Office Action Issued Apr. 23, 2020, 29 pages, No English Translation.
CN201810799987.6, Chinese Office Action Issued Oct. 19, 2020, 6 pages, No English Translation.
CN201810799987.6, Chinese Office Action Issued May 11, 2020, 26 pages, No English Translation.
CN201810800001.2, Chinese Office Action Issued May 13, 2020, 33 pages, No English Translation.
CN201810800001.2, Chinese Office Action Issued Nov. 4, 2020, 10 pages, No English Translation.
CN201810849509.1, Chinese Office Action Issued Mar. 30, 2020, 3 pages, No English Translation.
CN201810849509.1, Chinese Office Action Issued Oct. 9, 2020, 4 pages, No English Translation.
CN201810849480.7, Chinese Office Action Issued May 22, 2020, 6 pages, No English Translation.
CN201810849484.5, Chinese Office Action Issued Jul. 3, 2020, 6 pages, No English Translation.
CN201810849483.0, Chinese Office Action Issued Jul. 30, 2020, 8 pages, No English Translation.
CN201810849497.2, Chinese Office Action Issued May 26, 2020, 7 pages, No English Translation.
CN201810849486.4, Chinese Office Action Issued Apr. 26, 2020, 9 pages, No English Translation.
CN201810849486.4, Chinese Office Action Issued Jan. 5, 2021, 7 pages, No English Translation.
CN201810849492.X, Chinese Office Action Issued Apr. 22, 2020, 8 pages, No English Translation.
CN201810849492.X, Chinese Office Action Issued Jan. 7, 2021, 5 pages, No English Translation.
CN201810849479.4, Chinese Office Action Issued Apr. 26, 2020, 8 pages, No English Translation.
CN201810849479.4, Chinese Office Action Issued Nov. 4, 2020, 21 pages, No English Translation.
CN201810849491.5, Chinese Office Action Issued Apr. 22, 2020, 10 pages, No English Translation.
CN201810849491.5, Chinese Office Action Issued Dec. 8, 2020, 7 pages, No English Translation.
CN201810849498.7, Chinese Office Action Issued Jul. 1, 2020, 7 pages, No English Translation.
CN201810849496.8, Chinese Office Action Issued Aug. 3, 2020, 18 pages, No English Translation.
CN201810849485.X, Chinese Office Action Issued Apr. 21, 2020, 8 pages, No English Translation.
CN201810849485.X, Chinese Office Action Issued Jan. 7, 2021, 4 pages, No English Translation.
CN201810849499.1, Chinese Office Action Issued May 21, 2020, 7 pages, No English Translation.
Cn2018108494883, Chinese Office Action Issued Jul. 23, 2020, 8 pages, No English Translation.
CN201711036374.9—Office Action mailed on Mar. 23, 2023, 8 pages (With Brief English Explanation).
CN201880002336.8—Office Action mailed on Mar. 31, 2023, 8 pages (With Brief English Explanation).
CN202010189354.0—Office Action mailed on Mar. 30, 2023, 8 pages (With Brief English Explanation).
CN202010190143.9—Office Action mailed on Mar. 23, 2023, 10 pages (With Brief English Explanation).
CN202010309559.8—First Office Action mailed on Mar. 8, 2023, 8 pages (With Brief English Translation).
CN201711211933.5—Second Office Action mailed on Jun. 9, 2021, 12 pages.
CN201711212125.0—Second Office Action mailed on Jul. 12, 2021, 37 pages.
CN20171124402.0—Notice of Grant, mailed on Jul. 15, 2022, 5 pages.
CN201810799954.1—First Office Action mailed on Feb. 2, 2021, 40 pages.
CN201810849488.3—Second Office Action mailed on Mar. 2, 2021, 11 pages.

(56) References Cited

OTHER PUBLICATIONS

CN201810849496.8—Notice of Grant mailed on Jul. 8, 2021, 4 pages.
CN201810849497.2—Notice of Grant mailed on Nov. 5, 2020, 4 pages.
CN201810849498.7—Notice of Grant mailed on May 8, 2021, 4 pages.
CN201810849499.1—First Office Action mailed on May 21, 2020, 11 pages.
CN201810849509.1—First Office Action mailed on Mar. 30, 2020, 9 pages.
CN201810849509.1—Second Office Action mailed on Oct. 9, 2020, 11 pages.
CN201811436410.5—Notice of Grant mailed on Nov. 5, 2020, 4 pages.
CN201811440571.1—Notice of Grant mailed on May 7, 2021, 4 pages.
CN201910070501.X—Notice of Grant mailed on Feb. 9, 2021, 4 pages.
CN202010190142.4—Chinese Office Action mailed on Dec. 20, 2022, 11 pages (With brief English explanation).
CN202010336354.9—Chinese Office Action mailed on Dec. 30, 2022, 11 pages (With brief English explanation).
Xufei Liu, "Say goodbye to Photoshop, Decryption of neural network based skin adjustment technic", Computer Fan, Apr. 15, 2017, 2 pages.
CN 201911062123.7—First Office Action, mailed Oct. 9, 2021, 16 pages. (with English translation).
CN 201911058910.4—First Office Action, mailed Dec. 2, 2021, 17 pages. (with English translation).
CN 01811440484.6—First Office Action, mailed Nov. 1, 2021, 20 pages. (with English translation).
CN 201711212991.X—Third Office Action, mailed Apr. 2, 2021, 33 pages. (with English translation).
CN 201810800665.9—Second Office Action, mailed Nov. 11, 2021, 18 pages. (with English translation).
CN 201810799988.0—First Office Action, mailed Apr. 6, 2021, 22 pages. (with English translation).
CN 201810801236.3—Second Office Action, mailed Feb. 3, 2021, 20 pages. (with English translation).
CN 201810799954.1—First Office Action, mailed Feb. 2, 2021, 40 pages. (with English translation).
CN 201810799954.1—Second Office Action, mailed Nov. 10, 2021, 20 pages. (with English translation).
CN 201810800664.4—First Office Action, mailed Feb. 1, 2021, 67 pages. (with English translation).
CN 201810800664.4—Second Office Action, mailed Nov. 24, 2021, 19 pages. (with English translation).
CN 201810801238.2—First Office Action, mailed Mar. 18, 2021, 88 pages. (with English translation).
CN 201810849509.1—Third Office Action, mailed Mar. 22, 2021, 19 pages. (with English translation).
EP 18873474.3—Extended European Search Report, mailed Sep. 2, 2021, 7 pages.
EP 18873474.3—Communication pursuant to Rules 70(2) and 70a(2) EPC, mailed Sep. 21, 2021, 1 page.
CN 201810849484.5—Second Office Action, mailed Apr. 6, 2021, 13 pages. (with English translation).
CN 201810801238.2—Second Office Action, mailed Sep. 14, 2021, 25 pages. (with English translation).
CN 201911058839 X—First Office Action, mailed Oct. 26, 2021, 21 pages. (with English translation).
CN 201711212991.X—Rejection Decision, mailed Nov. 26, 2021, 10 pages. (with brief English explanation).
CN 201810800665.9—First Office Action, mailed Feb. 8, 2021, 33 pages. (with brief English explanation).
Zhijian Lu, "The Research on Parallel Architecture for FPGA-Based Convolutional Neural Networks", Apr. 1, 2014, 51 pages. (with English Abstract).

Unknown Author, "The Latest Development of Speech Recognition Framework—Deep Full-Sequence Convolutional Neural Network Debut", Aug. 5, 2016, 9 pages. (with English Abstract).
Chou et al., "VEGAS: Soft Vector Processor with Scratchpad Memory", FPGA '11: Proceedings of the 19th ACM/SIGDA international symposium on Field programmable gate arrays, Feb. 2011, 10 pages.
"Learning BLAS library—ROT", Cocoonyang, dated Mar. 17, 2017, 1 page.
CN 201711212123.1—First Office Action mailed on Dec. 26, 2019, 37 pages.
CN 201711244020.3, First Office Action, mailed Jan. 7, 2022, 14 pages, (with English translation).
CN 201810800664.4, Office Action, mailed Apr. 8, 2022, 8 pages, (With brief English explanation).
CN 201810800665.9—Office Action, mailed Apr. 8, 2022, 8 pages. (With brief English explanation).
CN 201810801238.2, Office Action, mailed Jan. 10, 2022, 10 pages, (With brief English explanation).
CN201711212125.0, Chinese Office Action Issued Apr. 12, 2022, 11 pages, (With brief English explanation).
CN201810799954.1, Chinese Office Action Issued Apr. 8, 2022, 8 pages. (With brief English explanation).
Development Tutorial for ARM Cortex-A9 Multi-cores embedded system, 2016, 5 Pages. (With brief English explanation ).
Frank Vahid et al., "Embedded Systems Design: A Unified Hardware/Software Introduction" , 2004, p. 42.
CN 201911058910.4—Second Office Action, mailed Jul. 4, 2022, 6 pages. (With brief English Explanation).
"Learning BLAS library—ROT", Cocoonyang, dated Mar. 17, 2017, 2 pages (With Brief English Explanation).
CN201711211933.5—First Office Action mailed on Dec. 16, 2020, 19 pages.
CN201711212122.7—First Office Action mailed on Jul. 17, 2020, 30 pages.
CN201711212123.1—Second Office Action mailed on May 21, 2020, 36 pages.
CN201711212125.0—First Office Action mailed on Dec. 16, 2020, 36 pages.
CN201711212656.X—First Office Action mailed on Nov. 27, 2019, 15 pages.
CN201711212656.X—Second Office Action mailed on Jun. 28, 2020, 21 pages.
CN201711212660.6—First Office Action mailed on Dec. 16, 2020, 31 pages.
CN201711212991.X—First Office Action mailed on Aug. 26, 2020, 15 pages.
CN201711212991.X—Third Office Action mailed on Apr. 2, 2021, 33 pages.
CN201711212994.3—Second Office Action mailed on Jul. 13, 2021, 16 pages.
CN201711212994.3, Chinese Office Action mailed Nov. 20, 2020, 42 pages, (With Brief English Explanation).
CN201711212995.8—First Office Action mailed on Nov. 27, 2019, 15 pages.
CN201711212995.8—Second Office Action mailed on Jun. 28, 2020, 22 pages.
CN201810849480.7—First Office Action mailed on May 22, 2020, 10 pages.
CN201810799987.6—First Office Action mailed on May 11, 2020, 17 pages.
CN201810799987.6—Second Office Action mailed on Oct. 19, 2020, 11 pages.
CN201810800001.2—First Office Action mailed on May 13, 2020, 25 pages.
CN201810800001.2—Second Office Action mailed on Nov. 4, 2020, 28 pages.
CN201810801236.3—First Office Action mailed on Apr. 23, 2020, 23 pages.
CN201810801239.7—First Office Action mailed on Apr. 29, 2020, 24 pages.
CN201810801239.7—Second Office Action mailed on Oct. 16, 2020, 13 pages.

(56) References Cited

OTHER PUBLICATIONS

CN201810849479.4—First Office Action mailed on Apr. 26, 2020, 16 pages.
CN201810849479.4—Second Office Action mailed on Nov. 4, 2020, 16 pages.
CN201810849483.0—First Office Action mailed on Jul. 30, 2020, 16 pages.
CN201810849484.5—First office Action mailed on Jul. 3, 2020, 10 pages.
CN201810849485.X—First Office Action mailed on Apr. 21, 2020, 15 pages.
CN201810849485.X—Second Office Action mailed on Jan. 7, 2021, 11 pages.
CN201810849486.4—First Office Action mailed on Apr. 26, 2020, 19 pages.
CN201810849486.4—Second Office Action mailed on Jan. 5, 2021, 16 pages.
CN201810849488.3—First Office Action mailed Jul. 23, 2020, 16 pages.
CN201810849491.5—First Office Action mailed on Apr. 22, 2020, 18 pages.
CN201810849492.X—First Office Action mailed on Apr. 22, 2020, 15 pages.
CN201810849492.X—Second Office Action mailed on Jan. 7, 2021, 13 pages.
CN201810849496.8—First Office Action mailed on Aug. 3, 2020, 17 pages.
CN201810849497.2, Chinese Office Action mailed May 26, 2020, 13 pages.
CN201810849498.7—First Office Action mailed on Jul. 1, 2020, 12 pages.
CN201811436410.5—First Office Action mailed on Apr. 30, 2020, 13 pages.
CN201811440571.1—First Office Action mailed on Apr. 30, 2020, 20 pages.
CN201811440571.1—Second Office Action mailed on Nov. 4, 2020, 12 pages.
CN201910067288.7—First Office Action mailed on May 22, 2020, 29 pages.
CN201910067288.7—Second Office Action mailed on Oct. 29, 2020, 27 pages.
CN201910070501.X—First Office Action mailed on May 11, 2020, 29 pages.
CN201910070501.X—Second Office Action mailed on Oct. 29, 2020, 9 pages.
PCT/CN2018/105463—International Search Report and Written Opinion mailed on Dec. 3, 2018, 12 pages.
Xufei Liu, "Say goodbye to Photoshop, Decryption of neural network based skin adjustment technic", Computer Fan, Apr. 15, 2017, 3 pages (With Brief English Explanation).
Abdel-Hamid et al., "Convolutional Neural Networks for Speech Recognition", IEEE/ACM Transactions on Audio, Speech, and Language Processing, vol. 22, No. 10, pp. 1533-1545, Oct. 2014, 13 pages.
Huang et al., "An Analysis of Convolutional Neural Networks for speech Recognition", 2015 IEEE International Conference on Acoustics, Speech and Signal Processing (ICASSP), Apr. 19, 2015, 5 pages.
Qian et al., "Very deep convolutional neural networks for robust speech recognition", 2016 IEEE Spoken Language Technology Workshop (SLT), 2016, 8 pages.
Sainath et al., "Improvements to deep convolutional neural networks for LVCSR", 2013 IEEE workshop on automatic speech recognition and understanding, 2013, 6 pages.
Tung et al., "Deep Neural Network Compression by In-parallel Pruning-quantization" IEEE Transactions on Pattern Analysis and Machine Intelligence, vol. 42, No. 3, 2018, pp. 568-579.
U.S. Appl. No. 16/760,235—Final Office Action mailed on Feb. 21, 2024, 10 pages.
U.S. Appl. No. 16/760,235—Non-Final Office Action mailed on Aug. 2, 2023, 9 pages.
U.S. Appl. No. 17/119,093—Final Office Action mailed on Feb. 22, 2024, 32 pages.
U.S. Appl. No. 17/119,093—Non-Final Office Action mailed on Jun. 21, 2023, 35 pages.
U.S. Appl. No. 17/119,148—Non-Final Office Action mailed on May 10, 2023, 11 pages.
U.S. Appl. No. 17/119,148—Notice of Allowance mailed on Nov. 22, 2023, 10 pages.
U.S. Appl. No. 17/119,193—Non-Final Office Action mailed on Aug. 23, 2023, 46 pages.
U.S. Appl. No. 17/119,213—Non-Final Office Action mailed on Aug. 25, 2023, 15 pages.
U.S. Appl. No. 17/119,234—Non-Final Office Action mailed on Sep. 13, 2023, 34 pages.
U.S. Appl. No. 17/119,269—Non-Final Office Action mailed on Aug. 7, 2023, 16 pages.
U.S. Appl. No. 17/119,269—Notice of Allowance mailed on Feb. 27, 2024, 10 pages.
U.S. Appl. No. 17/119,309—Corrected Notice of Allowability mailed on Mar. 24, 2023, 8 pages.
U.S. Appl. No. 17/119,309—Non-Final Office Action mailed on Aug. 24, 2022, 50 pages.
U.S. Appl. No. 17/119,309—Notice of Allowance mailed on Jun. 20, 2023, 15 pages.
U.S. Appl. No. 17/119,309—Notice of Allowance mailed on Mar. 9, 2023, 11 pages.
U.S. Appl. No. 17/119,347—Non-Final Office Action mailed on Aug. 15, 2023, 23 pages.
U.S. Appl. No. 17/119,347—Notice of Allowance mailed on Feb. 23, 2024, 12 pages.
U.S. Appl. No. 17/119,234—Final rejection mailed on Jun. 4, 2024, 39 pages.
U.S. Appl. No. 17/119,213—Notice of Allowance mailed on Mar. 21, 2024, 17 pages.
U.S. Appl. No. 17/119,093—Final Rejection mailed on Mar. 26, 2024, 30 pages.
U.S. Appl. No. 16/760,235—Corrected Notice of Allowability mailed on May 16, 2024, 2 pages.
U.S. Appl. No. 17/119,269—Notice of Allowability mailed on Apr. 4, 2024, 3 pages.
U.S. Appl. No. 17/119,347—Supplemental Notice of Allowability mailed on Apr. 16, 2024, 2 pages.
U.S. Appl. No. 17/119,193—Notice of Allowance mailed on Apr. 4, 2024, 16 pages.
U.S. Appl. No. 16/760,235—Notice of Allowance mailed on Apr. 26, 2024, 5 pages.

\* cited by examiner

| Opcode | Register 0 | Register 1 | Register 2 | Register 3 | Register 4 |
|---|---|---|---|---|---|
| COMPUTE | Input data Starting address | Input data Length | Convolution kernel Starting address | Convolution kernel Length | Address of an activation function interpolation table |
| IO | Address of an external memory of data | Data length | Address of an internal memory of data | | |
| NOP | | | | | |
| JUMP | Target address | | | | |
| MOVE | Input address | Data size | Output address | | |

FIG. 1C

INFORMATION PROCESSING METHOD AND TERMINAL DEVICE

CROSS REFERENCE TO RELATED APPLICATIONS

This application is a continuation of U.S. patent application Ser. No. 16/760,235 filed Apr. 29, 2020, which is a 371 of International Patent Application No. PCT/CN2018/105463, filed Sep. 13, 2018. The contents of each of the above-captioned patent applications are hereby expressly incorporated herein by reference in their entireties.

TECHNICAL FIELD

The present disclosure relates to the technical field of information technology, and particularly to an information processing method and related products.

BACKGROUND

With the growing information technology and people's ever-increasing demand, the need for timeliness of information becomes stronger. At present, a terminal obtains and processes information based on a general-purpose processor, such as running a specified application in a general-purpose processor to realize language translation, reply, and the like.

However, in practical applications, this way of obtaining information by a general-purpose processor running a software program may be limited by the operating speed of the general-purpose processor, and in particular, when the general-purpose processor has a large load, the efficiency of obtaining information may be low and the delay may be long.

SUMMARY

Examples of the present disclosure provide an information computation method and related products, which can increase processing speed and efficiency of a computation device.

In a first aspect, an example of the present disclosure provides an information processing method which is applied to a computation device, where the computation device includes a communication unit and an operation unit. The method includes:
  controlling, by the computation device, the communication unit to obtain first language information input by a user;
  controlling, by the computation device, the operation unit to obtain and call an operation instruction to process the first language information to obtain second language information, where
  when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side.

In some possible examples, the computation device further includes a register unit and a controller unit, and the controlling, by the computation device, the operation unit to obtain and call an operation instruction to process the first language information includes:
  controlling, by the computation device, the controller unit to fetch an operation instruction associated with a network model from the register unit, and sending, by the computation device, the operation instruction to the operation unit; and
  controlling, by the computation device, the operation unit to call the operation instruction to process the first language information to obtain second language information.

In some possible examples, the operation instruction includes a first operation instruction and a second operation instruction, the computation device further includes a register unit and a controller unit, and the controlling, by the computation device, the operation unit to obtain and call an operation instruction to process the first language information includes:
  controlling, by the computation device, the controller unit to fetch a first operation instruction and a second operation instruction associated with a network model from the register unit;
  controlling, by the computation device, the operation unit to call the first operation instruction to pre-process the first language information to obtain intermediate language information conforming to a preset format, where the preset format at least includes: a vector of a specified length,
  controlling, by the computation device, the operation unit to call the second operation instruction associated with the network model to process the intermediate language information to obtain the second language information, where
  the network model includes a preset neural network model or a preset non-neural network model.

In some possible examples, when the network model is a neural network model, the neural network model includes any one or more of the following functional layers: a convolution operation layer, a pooling layer, an activation softmax layer, a batch normalization layer, and a fully connected layer, where the function layers are composed of at least one pre-stored operation instruction.

In some possible examples, the functional layers composing the neural network model, a count of the functional layers, and an order of the functional layers are customized by a user side or a terminal side.

In some possible examples, the neural network model includes any one of the following: a deep neural network (DNN) model, a convolutional neural network (CNN) model, a recurrent neural network (RNN) model, a back-propagation (BP) neural network model, a long and short term memory (LSTM) network model, and a gate repeat unit (GRU) model.

In some possible examples, when the neural network model is a non-neural network model,
  the controlling, by the computation device, the operation unit to call the second operation instruction associated with the network model to process the intermediate language information to obtain the second language information includes:
  controlling, by the computation device, the operation unit to obtain a plurality of language information corresponding to the intermediate language information by using a pre-stored priori mapping relationship in the non-neural network model;
  controlling, by the computation device, the operation unit to call the second operation instruction associated with the non-neural network model, respectively computing scores corresponding to the plurality of language information, and selecting language information whose score exceeds a preset threshold from the plurality of scores as the second language information, where the priori mapping relationship includes at least a mapping relationship between words in the first language information (the intermediate language information) and words in the second language information, and the first language information and the second language information are composed of a plurality of words.

In some possible examples, when the neural network model is a neural network model, the controlling, by the computation device, the operation unit to call the second operation instruction associated with the network model to process the intermediate language information to obtain the second language information includes:

controlling, by the computation device, the operation unit to call the second operation instruction associated with the neural network model to predict the intermediate language information to obtain a plurality of language information; and controlling, by the computation device, the operation unit to call a third operation instruction, respectively computing scores corresponding to the plurality of language information, and selecting language information whose score exceeds a preset threshold from the plurality of scores as the second language information.

In some possible examples, the computation device further includes a data access unit and a storage medium, the computation device controls the operation unit to send the second language information to the data access unit and store the second language information in the storage medium.

In some possible examples, the operation unit includes a primary operation module and a plurality of secondary operation modules, where the primary operation module is interconnected with the plurality of secondary operation modules by an interconnection module, and when the operation instruction is a convolution operation instruction, the calling the operation instruction to process the first language information includes:

controlling, by the computation device, the secondary operation modules to implement a convolution operation of input data and convolution kernels in a convolutional neural network algorithm, where the input data is the first language information and the convolutional neural network algorithm corresponds to the convolution operation instruction;

controlling, by the computation device, the interconnection module to implement data transfer between the primary operation module and the secondary operation modules, before a forward operation of a neural network fully connected layer starts, transferring, by the primary operation module, the input data to each secondary operation module through the interconnection module; and after the computation of the secondary operation modules is completed, splicing, by the interconnection module, output scalars of the respective secondary operation modules stage by stage to obtain an intermediate vector, and sending the intermediate vector back to the primary operation module; and controlling, by the computation device, the primary operation module to splice intermediate vectors corresponding of all input data into an intermediate result for subsequent operations, so as to obtain the second language information.

In some possible examples, the performing subsequent operations on the intermediate result includes:

controlling, by the computation device, the primary operation module to add bias data to the intermediate result, and then performing an activation operation.

In some possible examples, the primary operation module includes a first operation unit, where the first operation unit includes a vector addition unit and an activation unit, the step of controlling, by the computation device, the primary operation module to add bias data to the intermediate result, and then performing an activation operation include:

controlling, by the computation device, the vector addition unit to implement a bias addition operation of a convolutional neural network operation and perform element-wise addition on bias data and the intermediate result to obtain a bias result; and controlling, by the computation device, the activation unit to perform an activation function operation on the bias result.

In some possible examples, the primary operation module includes a first storage unit, a first operation unit, a first data dependency determination unit, and a first storage unit. The method further includes:

controlling, by the computation device, the first storage unit to cache input data and output data used by the primary operation module during a computation process, where the output data includes the second language information;

controlling, by the computation device, the first operation unit to perform various operational functions of the primary operation module;

controlling, by the computation device, the data dependency determination unit to ensure that there is no consistency conflict in reading data from and writing data to the first storage unit, read an input neuron vector from the first storage unit, and send the vector to the secondary operation modules through the interconnection module; and sending an intermediate result vector from the interconnection module to the first operation unit.

In some possible examples, each secondary operation module includes a second operation unit, where the second operation unit includes a vector multiplication unit and an accumulation unit, the controlling, by the computation device, the secondary operation modules to perform a convolution operation of input data and a convolution kernel in a convolutional neural network algorithm includes:

controlling, by the computation device, the vector multiplication unit to perform a vector multiplication operation of the convolution operation, and controlling, by the computation device, the accumulation unit to perform an accumulation operation of the convolution operation.

In some possible examples, each secondary operation module includes a second operation unit, a second data dependency determination unit, a second storage unit, and a third storage unit. The method further includes:

controlling, by the computation device, the second operation unit to perform various arithmetic and logical operations of the secondary operation modules;

controlling, by the computation device, the second data dependency determination unit to perform a reading/ writing operation on the second storage unit and the third storage unit during a computation process and ensure that there is no consistency conflict between the reading and writing operations on the second storage unit and the third storage unit;

controlling, by the computation device, the second storage unit to cache input data and an output scalar obtained from the computation performed by the secondary operation modules; and controlling, by the computation device, the third storage unit to cache a convolution kernel required by the secondary operation module during a computation process.

In some possible examples, the first data dependency or the second data dependency ensures that there is no consistency conflict in reading and writing in the following manners: storage addresses corresponding to data/instructions stored in the corresponding storage unit do not overlap; or determining whether there is dependency between a control signal that has not been executed and data of a control signal that is being executed, if there is no dependency, the control signal is allowed to be issued immediately, otherwise, the control signal is not allowed to be issued until all control signals on which the control signal is dependent have been executed, where a process of obtaining the control signal includes that the computation device controls the controller unit to obtain an operation instruction from the register unit and decode the operation instruction into the control signal for controlling behavior of other modules, wherein the other modules include the primary operation module and the plurality of secondary operation modules.

In some possible examples, the computation device controls the plurality of secondary operation modules to compute respective output scalars in parallel by using the same input data and respective convolution kernels.

In some possible examples, an activation function active used by the primary operation module may be any of the following non-linear functions: sigmoid, tanh, relu, softmax, or may be a linear function.

In some possible examples, the interconnection module forms a data channel for continuous or discrete data between the primary operation module and the plurality of secondary operation modules. The interconnection module has any of the following structures: a tree structure, a ring structure, a grid structure, a hierarchical interconnection, and a bus structure.

In a second aspect, an example of the present disclosure provides a computation device which includes a function unit configured to perform the methods of the first aspect.

In a third aspect, an example of the present disclosure provides a computer readable storage medium on which a computer program used for electronic data exchange is stored, where the computer program enables a computer to perform the methods of the first aspect.

In a fourth aspect, an example of the present disclosure further provides a computer program product which includes a non-transitory computer readable storage medium storing a computer program. The computer program may cause a computer to perform the methods of the first aspect.

In a fifth aspect, an example of the present disclosure provides a chip which includes the computation device of the second aspect.

In a sixth aspect, an example of the present disclosure provides a chip package structure which includes the chip of the fifth aspect.

In a seventh aspect, an example of the present disclosure provides a board card which includes the chip package structure of the sixth aspect.

In an eighth aspect, an example of the present disclosure provides an electronic device which includes the board card of the seventh aspect.

In some examples, the electronic device includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

In some examples, the vehicle includes an airplane, a ship, and/or a car. The household electrical appliance includes a television, an air conditioner, a microwave oven, a refrigerator, a rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

Technical effects of implementing the examples of the present disclosure are as follows:

It can be seen that through the examples of the present disclosure, a computation device can control a communication unit to obtain first language information input by a user, and then control the operation unit to call an operation instruction to process the first language information to obtain second language information; when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side; in this way, the translation or reply of a target language can be intelligently, accurately, and quickly implemented. Compared with the prior art using a general-purpose processor for translation or reply of a target language, the technical solutions of the present disclosure have technical effects of lower power consumption and faster speed.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

FIG. 1C is a schematic diagram of an instruction of a device supporting a convolutional neural network forward operation according to an example of the present disclosure.

DETAILED DESCRIPTION OF THE EXAMPLES

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but optionally includes steps or units that are not listed, or optionally includes other steps or units inherent to the process, the method, the product, or the equipment.

Reference to "example" means that a particular feature, a structure, or a characteristic described in conjunction with the example may be included in at least one example of the present disclosure. The term used in various places in the specification does not necessarily refer to the same example, nor does it refer to an example that is mutually exclusive, independent, or alternative to other examples. It can be explicitly and implicitly understood by those skilled in the art that the examples described herein may be combined with other examples.

Figure 1A:
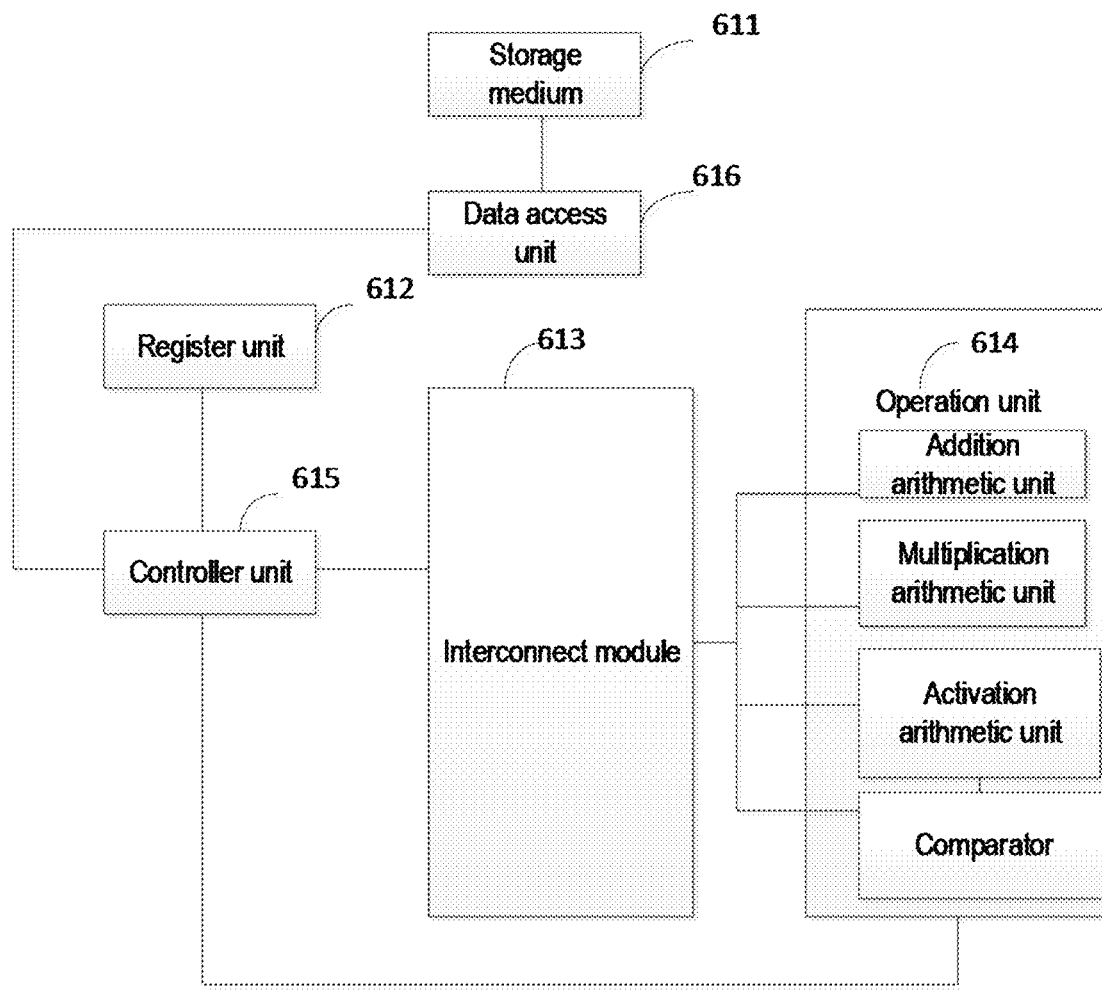
FIG. 1A is a structural diagram of a computation device according to an example of the present disclosure.

First, a computation device used in the present disclosure is introduced. FIG. 1A provides a computation device, where the device includes a storage medium 611 (optional), a register unit 612, an interconnection module 613, an operation unit 614, a control unit 615, and a data access unit 616; where the operation unit 614 include at least two of the following: an addition arithmetic unit, a multiplication arithmetic unit, a comparator, and an activation arithmetic unit.

The interconnection module 613 is configured to control a connection relationship of the arithmetic units in the operation unit 614 so that the at least two arithmetic units form a different computation topology.

The instruction storage unit (which may be a register unit, an instruction cache, or a scratchpad memory) 612 is configured to store the operation instruction, an address of a data block in the storage medium, and a computation topology corresponding to the operation instruction.

The operation instruction may include an operation field and an opcode. Taking a convolution operation instruction as an example, as shown in Table 1, register 0, register 1, register 2, register 3, and register 4 may be operation fields. Each of register 0, register 1, register 2, register 3, and register 4 may be one or a plurality of registers.

| Opcode | Register 0 | Register 1 | Register 2 | Register 3 | Register 4 |
|---|---|---|---|---|---|
| COMPUTE | Input data starting address | Input data length | Convolution kernel starting address | Convolution kernel length | Address of an activation function interpolation table |
| IO | Address of an external memory of data | Data length | Address of an internal memory of data | | |
| NOP | | | | | |
| JUMP | Target address | | | | |
| MOVE | Input address | Data size | Output address | | |

The storage medium 611 may be an off-chip memory, and in certain applications, may also be an on-chip memory for storing a data block. The data block may be n-dimensional data, where n is an integer greater than or equal to 1. For instance, when n=1, the data is one-dimensional data, which is a vector; when n=2, the data is two-dimensional data, which is a matrix; and when n is equal to or greater than 3, the data is multi-dimensional data.

The control unit 615 is configured to fetch an operation instruction, an operation field corresponding to the operation instruction, and a first computation topology corresponding to the operation instruction from the register unit 612, and decode the operation instruction into an execution instruction. The execution instruction is configured to control the operation unit to perform an operation, transfer the operation field to the data access unit 616, and transfer the computation topology to the interconnection module 613.

The data access unit 616 is configured to fetch a data block corresponding to the operation field from the storage medium 611 and transfer the data block to the interconnection module 613.

The interconnection module 613 is configured to receive the first computation topology and the data block. In an example, the interconnection module 613 is further configured to rearrange the data block according to the first computation topology.

The operation unit 614 is configured to call an arithmetic unit of the operation unit 614 according to the execution instruction to perform an operation on the data block to obtain an operation result, transfer the operation result to the data access unit, and store the result in the storage medium. In an example, the operation unit 614 is configured to call an arithmetic unit according to the first computation topology and the execution instruction to perform an operation on the rearranged data block to obtain an operation result, transfer the operation result to the data access unit, and store the result in the storage medium.

In another example, the interconnection module 613 is configured to form the first computation topology according to the connection relationships of the arithmetic units in the control operation unit 614.

An interconnection module is set in the computation device provided by the present disclosure. The interconnecting module can connect the arithmetic units in the computation unit to obtain a computation topology corresponding to the computation instruction according to the needs of the computation instruction, so that there is no need to store or fetch intermediate data of the computation in subsequent operations of the operation unit. Through this structure, a single instruction can implement a single input and perform operations of a plurality of arithmetic units to obtain a computation result, which improves the computation efficiency.

A computation method of the computation device shown in FIG. 1A is explained below based on different operation instructions. As an instance, the operation instruction may be a convolution operation instruction. The convolution operation instruction can be applied to a neural network, so the convolution operation instruction may also be called a convolutional neural network operation instruction. A formula to be perform by the convolution operation instruction may be: $s=s(\Sigma wx_i+b)$, which is to multiply a convolution kernel w by input data $x_i$, find the sum, add a bias b, and then perform an activation operation s(h) to obtain a final output result s. According to the formula, the computation topology may be obtained, which is: the multiplication arithmetic unit—the addition arithmetic unit—the (optional) activation arithmetic unit.

A method of performing a convolution operation instruction by the computation device shown in FIG. 1A may include:

fetching, by the control unit 615, a convolution operation instruction, an operation field corresponding to the convolution operation instruction, and the first computation topology (the multiplication arithmetic unit—the addition arithmetic unit—the addition arithmetic unit—the activation arithmetic unit) corresponding to the convolution operation instruction from the register unit 612; transferring, by the control unit, the operation field to a data access unit, and transferring the first computation topology to the interconnection module;

fetching, by the data access unit, a convolution kernel w and a bias b (if b is 0, there is no need to fetch the bias b) corresponding to the operation field from the storage medium, and transferring the convolution kernel w and the bias b to the operation unit; and multiplying, by the multiplication arithmetic unit of the computation unit, a convolution kernel w and input data Xi to obtain a first result, inputting the first result to the addition arithmetic unit to perform addition to obtain a second result, adding the second result and a bias b to obtain a third result, inputting the third result to the activation arithmetic unit to perform an activation operation to obtain an output result S, transferring the output result S to the data access unit, and storing, by the data access unit, the output result in the storage medium. After each step, the result may be transferred to the data access and stored in storage medium without performing a following step. The step of adding the second result and the bias b to obtain the third result is optional, which means this step is not required when b is 0.

In addition, the order of addition and multiplication can be reversed.

The technical solution provided by the present disclosure can realize convolution operations according to one instruction which is a convolution operation instruction. There is no need to store or obtain intermediate data of convolution operations (such as a first result, a second result, and a third result). The technical solution may reduce the storing and obtaining operations of intermediate data, and may have technical effects of reducing a corresponding operation step and improving outcomes of convolution operations.

It should be understood that the instruction set used in the present disclosure may include one or a plurality of operation instructions. The operation instruction includes, but is not limited to a COMPUTE instruction (an operation instruction), a CONFIG instruction, an IO instruction, an NOP instruction, a JUMP instruction, a MOVE instruction, etc. The COMPUTE instruction includes, but is not limited to, a convolution (CONV) instruction, a pooling operation instruction, etc. Specifically, an executable computation instruction in the present disclosure includes:

a convolution operation instruction. In an example, the convolution COMPUTE instruction (the CONV instruction) includes:

a convolutional neural network sigmoid instruction: according to the instruction, a device fetches input data and a convolution kernel of a specified size from a specified address in a memory (optionally a scratchpad memory or a scalar register file), performs a convolution operation in a convolution operation component, and optionally, performs sigmoid activation on an output result;

a convolutional neural network TanH instruction: according to the instruction, the device fetches input data and a convolution kernel of a specified size from a specified address in a memory (optionally a scratchpad memory) respectively, performs a convolution operation in the convolution operation component, and then performs TanH activation on an output result;

a convolutional neural network ReLU instruction: according to the instruction, the device fetches input data and a convolution kernel of a specified size from a specified address in the memory (optionally a scratchpad memory) respectively, performs a convolution operation in a convolution operation component, and then performs ReLU activation on an output result; and a convolutional neural network group instruction: according to the instruction, the device fetches input data and a convolution kernel of a specified size from a specified address in the memory (optionally a scratchpad memory) respectively, partitions the input data and the convolution kernel into groups, performs a convolution operation in a convolution operation component, and then performs activation on an output result.

A convolution operation instruction (pure convolution operation instruction): according to the instruction, the device fetches input data and a convolution kernel of a specified size from a specified address in the memory (optionally a scratchpad memory) respectively, and performs a convolution operation in a convolution operation component. The above-mentioned specified size may be set by the user or manufacturer. For instance, in a computation device of a first manufacturer, the specified size may be set to data of A bit, and in a computation device of a second manufacturer, the specified size may be set to data of B bit. The data of A bit and the data of B bit have different sizes.

The pooling instruction. In an example, the pooling COMPUTE instruction (the pooling operation instruction, which is also referred to as the pooling instruction in the present disclosure) specifically includes:

a Maxpooling forward operation instruction: according to the instruction, the device fetches input data of a specified size from a specified address in a memory (optionally a scratchpad memory or a scalar register file), performs a Maxpooling forward operation in a pooling operation component, and writes a computation result back to a specified address in the memory (optionally a scratchpad memory or a scalar register file);

a Maxpooling backward training instruction: according to the instruction, the device fetches input data of a specified size from a specified address in a memory (optionally a scratchpad memory or a scalar register file), performs Maxpooling backward training in a pooling operation component, and writes a computation result back to a specified address in the memory (optionally a scratchpad memory or a scalar register file);

an Avgpooling forward operation instruction: according to the instruction, the device fetches input data of a specified size from a specified address in a memory (optionally a scratchpad memory or a scalar register file), performs an Avgpooling forward operation in a pooling operation component, and writes a computation result back to a specified address in the memory (optionally a scratchpad memory or a scalar register file);

an Avgpooling backward training instruction: according to the instruction, the device fetches input data of a specified size from a specified address in a memory (optionally a scratchpad memory or a scalar register file), performs Avgpooling backward training in a pooling operation component, and writes a computation result back to a specified address in the memory (optionally a scratchpad memory or a scalar register file);

a Minpooling forward operation instruction: according to the instruction, the device fetches input data of a specified size from a specified address in a memory (optionally a scratchpad memory or a scalar register file), performs a Minpooling forward operation in a pooling operation component, and writes a computation result back to a specified address in the memory (optionally a scratchpad memory or a scalar register file); and a Minpooling backward training instruction: according to the instruction, the device fetches input data of a specified size from a specified address in a memory (optionally a scratchpad memory or a scalar register file), performs Minpooling backward training in a pooling operation component, and writes a computation result back to a specified address in the memory (optionally a scratchpad memory or a scalar register file).

A batch normalization instruction can be used for a batch normalization computation.

A fully connected instruction may include a fully connected layer forward operation instruction.

A fully connected layer forward operation instruction: according to the instruction, a device fetches weight data and bias data from a specified address in a memory, performs a full connection operation in a computation unit, and writes a computation result back to a specified address in a scratchpad memory.

The CONFIG instruction configures various constants required by a computation of a current artificial neural network layer before the computation starts. For instance, 1/kernel_area can be obtained by configuration using the CONFIG instruction. In the batch normalization computation, the CONFIG instruction configures various constants required for a current layer before a batch normalization computation begins.

The IO instruction is for reading-in input data required for a computation from an external storage space, and storing data to the external space after the computation finishes.

The NOP instruction is for emptying control signals in all control signal cache queues in the current device, and ensuring that all instructions before the NOP instruction are finished. The NOP instruction itself does not include any operations.

The JUMP instruction is for controlling jumping of a next instruction address to be read from an instruction storage unit, so that the jumping of a control flow can be realized.

The MOVE instruction is for moving data of an address in an internal address space of the device to another address in the internal address space of the device. This process is independent of an operation unit and does not occupy resources of the operation unit during execution.

Optionally, operation instructions that can be executed by the computation device may further include:

a Matrix Mult Vector (MMV) instruction: according to the instruction, the device fetches matrix data and vector data of a set length from a specified address in a scratchpad memory, performs a matrix-multiply-vector operation in the operation unit, and writes a computation result back to a specified address in the scratchpad memory; it is worth noting that a vector can be stored in the scratchpad memory as a matrix of a special form (a matrix with only one row of elements);

a Vector Mult Matrix (VMM) instruction: according to the instruction, the device fetches vector data and matrix data of a set length from a specified address in a scratchpad memory, performs a vector-multiply-matrix operation in the operation unit, and writes a computation result back to a specified address in the scratchpad memory; it is worth noting that a vector can be stored in the scratchpad memory as a matrix of a special form (a matrix with only one row of elements);

a Matrix Mult Scalar (VMS) instruction: according from instruction, the device fetches matrix data of a set length from a specified address in a scratchpad memory, fetches matrix data of a specified size from a specified address of a scalar register file, and performs a scalar-multiply-matrix operation in the operation unit, and writes a computation result back to a specified address in the scratchpad memory; it is worth noting that the scalar register file stores not only an address of the matrix but also scalar data;

a Tensor Operation (TENS) instruction: according to the instruction, the device fetches two pieces of matrix data of a set length from two specified addresses in a scratchpad memory, performs a tensor operation on the two pieces of matrix data in the operation unit, and writes a computation result back to a specified address of the scratchpad memory;

a Matrix Add Matrix (MA) instruction: according to the instruction, the device fetches two pieces of matrix data of a set length from two specified addresses in a scratchpad memory, adds the two pieces of matrix data in the operation unit, and writes a computation result back to a specified address in the scratchpad memory;

a Matrix Sub Matrix (MS) instruction: according to the instruction, the device fetches two pieces of matrix data of a set length from two specified addresses in a scratchpad memory, performs a subtraction operation on the two pieces of matrix data in the operation unit, and writes a computation result back to a specified address in the scratchpad memory;

a Matrix Retrieval (MR) instruction: according to the instruction, the device fetches vector data of a set length from a specified address in a scratchpad memory, fetches matrix data of a specified size from a specified address in the scratchpad memory; in the operation unit, the vector is an index vector, and an $i^{th}$ element of an output vector is a number obtained from an $i^{th}$ column of the matrix by using an $i^{th}$ element of the index vector as an index; and the output vector is written back to a specified address in the scratchpad memory;

a Matrix Load (ML) instruction: according to the instruction, the device loads data of a set length from a specified external source address to a specified address in a scratchpad memory;

a Matrix Store (MS) instruction: according to the instruction, the device stores matrix data of a set length from a specified address in a scratchpad memory to an external target address;

a Matrix Move (MMOVE) instruction: according to the instruction, the device moves matrix data of a set length from a specified address in a scratchpad memory to another specified address in the scratchpad memory;

a Vector-Inner-Product instruction (VP): according to the instruction, the device fetches vector data of a specified size from a specified address in a memory (optionally a scratchpad memory or a scalar register file), performs an inner product (a scalar) on two vectors in a vector computation unit, and writes the result back; optionally, the result is written back to a specified address in the memory (optionally a scratchpad memory or a scalar register file);

a vector cross product instruction (TENS): according to the instruction, the device fetches vector data of a specified size from a specified address in a memory (optionally a scratchpad memory or a scalar register file), performs an inner product (a scalar) on two vectors in a vector computation unit, and writes the result back; optionally, the result is written back to a specified address in the memory (optionally a scratchpad memory or a scalar register file);

a vector elementary arithmetic operation including a Vector-Add-Scalar instruction (VAS): according to the instruction, the device fetches vector data of a specified size from a specified address in a memory (optionally a scratchpad memory or a scalar register file), fetches scalar data from a specified address of a scalar register file of the memory, adds the scalar to each element of the vector in a scalar computation unit, and writes the result back; optionally, the result is written back to a specified address in the memory (optionally a scratchpad memory or a scalar register file);

a Scalar-Sub-Vector instruction (SSV): according to the instruction, the device fetches scalar data from a specified address in the scalar register in a memory (optionally a scratchpad memory or a scalar register file), fetches vector data from a specified address in the memory (optionally the scratchpad memory or the scalar register file), subtracts corresponding elements of the vector from the scalar in a vector computation unit, and writes the result back; optionally, the result is written back to a specified address in the memory (optionally a scratchpad memory or a scalar register file);

a Vector-Dev-Vector instruction (VD): according to the instruction, the device fetches vector data of a specified size from a specified address in a memory (optionally a scratchpad memory or a scalar register file), performs an element-wise division of two vectors in a vector computation unit, and writes the result back; optionally, the result is written back to a specified address in the memory (optionally a scratchpad memory or a scalar register file);

a Scalar-Dev-Vector instruction (SDV): according to the instruction, the device fetches scalar data from a specified address in the scalar register file of a memory (optionally a scratchpad memory or a scalar register file), fetches vector data of a specified size from a specified address in the memory (optionally the scratchpad memory), divides the scalar by corresponding elements in the vector in a vector computation unit, and writes the result back; optionally, the result is written back to a specified position in the memory (optionally a scratchpad memory or a scalar register file).

The computation device can also execute a vector logic instruction, including:

a Vector-AND-Vector instruction (VAV): according to the instruction, the device fetches vector data of a specified size from a specified address in a memory (optionally a scratchpad memory or a scalar register file) respectively, performs an element-wise AND on two vectors in a vector computation unit, and writes the result back; optionally, the result is written back to a specified address in the memory (optionally a scratchpad memory or a scalar register file);

a Vector-AND instruction (VAND): according to the instruction, the device fetches vector data of a specified size from a specified address in a memory (optionally a scratchpad memory or a scalar register file), performs an element-wise AND operation on two vectors in a vector computation unit, and writes the result back; optionally, the result is written back to a specified address in the scalar register file of the memory (optionally a scratchpad memory or a scalar register file);

a Vector-OR-Vector instruction (VOV): according to the instruction, the device fetches vector data of a specified size from a specified address in a memory (optionally a scratchpad memory) respectively, performs an element-wise OR operation on two vectors in a vector computation unit, and writes the result back; optionally, the result is written back to a specified address in the memory (optionally a scratchpad memory or a scalar register file);

a Vector-OR instruction (VOR): according to the instruction, the device fetches vector data of a specified size from a specified address in a memory (optionally a scratchpad memory or a scalar register file), performs an OR operation on each element of the vector in a vector computation unit, and writes the result back; optionally, the result is written back to a specified address in the scalar register file of the memory (optionally a scratchpad memory or a scalar register file);

a transcendental function instruction: according to the instruction, the device fetches vector data of a specified size from a specified address in a memory (optionally a scratchpad memory or a scalar register file), performs a transcendental function operation on the vector data in an operation unit, and writes the result back; optionally, the result is written back to a specified address in a storage unit of the memory (optionally a scratchpad memory or a scalar register file). Optionally, the result is written back specified address in the memory (optionally a scratchpad memory or a scalar register file);

The computation device can also execute a vector comparison operation instruction, including:

a Greater-Equal operation instruction (GE): according to the instruction, the device may obtain parameters of the instruction, including a length of a vector, a starting address of two vectors, and a storage address of an output vector, directly from the instruction or by accessing the serial number of the register of a memory (optionally a scratchpad memory or a scalar register file) provided by the instruction, then read data of the two vectors, and compare the elements at all positions in the vectors in a vector comparison operation unit; at the position of a row, if the value of a previous vector is greater than or equal to the value of a subsequent vector, the value of the comparison result vector at that position is set to 1, otherwise it is set to 0; finally, the comparison result is written back to a specified storage address in the memory (optionally the scratchpad memory or the scalar register file);

a Less-Equal operation instruction (LE): according to the instruction, the device may obtain the parameters of the instruction, including the length of a vector, the starting address of the two vectors, and the storage address of the output vector, directly from the instruction or by accessing the serial number of the register of a memory (optionally a scratchpad memory or a scalar register file) provided by the instruction, then read the data of the two vectors, and compare the elements at all positions in the vectors in a vector comparison operation unit; at the position of a row, if the value of a previous vector is less than or equal to the value of a subsequent vector, the value of the comparison result vector at that position is set to 1, otherwise it is set to 0; finally, the comparison result is written back to a specified storage address in the memory (optionally the scratchpad memory or the scalar register file);

a Greater-Than operation instruction (GT): according to the instruction, the device may obtain the parameters of the instruction, including the length of a vector, the starting address of the two vectors, and the storage address of the output vector, directly from the instruction or by accessing the serial number of the register of a memory (optionally a scratchpad memory or a scalar register file) provided by the instruction, then read the data of the two vectors, and compare the elements at all positions in the vectors in a vector comparison operation unit; at the position of a row, if the value of a previous vector is greater than the value of a subsequent vector, the value of the comparison result vector at that position is set to 1, otherwise it is set to 0; finally, the comparison result is written back to a specified storage address in the memory (optionally the scratchpad memory or the scalar register file);

a Less-Than operation instruction (LT): according to the instruction, the device may obtain the parameters of the instruction, including the length of a vector, the starting address of the two vectors, and the storage address of the output vector, directly from the instruction or by accessing the serial number of the register of a memory (optionally a scratchpad memory or a scalar register file) provided by the instruction, then read the data of the two vectors, and compare the elements at all positions in the vectors in a vector comparison operation unit; at the position of a row, if the value of a previous vector is less than the value of a subsequent vector, the value of the comparison result vector at that position is set to 1, otherwise it is set to 0; finally, the comparison result is written back to a specified storage address in the memory (optionally the scratchpad memory or the scalar register file);

an Equal operation instruction (EQ): according to the instruction, the device may obtain the parameters of the instruction, including the length of a vector, the starting address of the two vectors, and the storage address of the output vector, directly from the instruction or by accessing the serial number of the register of a memory (optionally a scratchpad memory or a scalar register file) provided by the instruction, then read the data of the two vectors, and compare the elements at all positions in the vectors in a vector comparison operation unit; at the position of a row, if the value of a previous vector is equal to the value of a subsequent vector, the value of the comparison result vector at that position is set to 1, otherwise it is set to 0; finally, the comparison result is written back to a specified storage address in the memory (optionally the scratchpad memory or the scalar register file);

an Unequal operation instruction (UEQ): according to the instruction, the device may obtain the parameters of the instruction, including the length of a vector, the starting address of the two vectors, and the storage address of the output vector, directly from the instruction or by accessing the serial number of the register of a memory (optionally a scratchpad memory or a scalar register file) provided by the instruction, then read the data of the two vectors, and compare the elements at all positions in the vectors in a vector comparison operation unit; at the position of a row, if the value of a previous vector is unequal to the value of a subsequent vector, the value of the comparison result vector at that position is set to 1, otherwise it is set to 0; finally, the comparison result is written back to a specified storage address in the memory (optionally the scratchpad memory or the scalar register file);

a Vector Max instruction (VMAX): according to the instruction, the device fetches vector data of a specified size from a specified address in a scratchpad memory of a memory (optionally a scratchpad memory or a scalar register file), selects a largest element from the vector data as a result, and writes the result back; optionally, the result is written back to a specified address in the scalar register file of the memory (optionally a scratchpad memory or a scalar register file);

a Vector Min instruction (VMIN): according to the instruction, the device fetches vector data of a specified size from a specified address in a memory (optionally a scratchpad memory or a scalar register file), selects a minimum element from the vector data as a result, and writes the result back; optionally, the result is written back to a specified address in the scalar register file of the memory (optionally a scratchpad memory or a scalar register file);

a Cyclic Shift operation instruction: according to the instruction, the device may obtain parameters of the instruction directly from the instruction or by accessing the serial number of the register of a memory (optionally a scratchpad memory or a scalar register file) provided by the instruction, then cyclically shift vectors in a vector shift unit (which may be a separate vector shift unit or a computation unit), and then write the result of the shift back to a specified storage address in the memory (optionally the scratchpad memory or the scalar register file); where a format of the cyclic shift operation instruction format may include four operation fields, a starting address and length of a vector, a shift stride, and a storage address of an output vector; and a Random-Vector generation instruction: according to the instruction, the device reads one or more randomly distributed parameters, and the size and storage address of a random vector to be generated from the instruction or from the register of a memory (optionally a scratchpad memory or a scalar register file), generates the random vector that is in line with the random distribution in a random vector generation unit, and then writes the result of the random vector back to the specified storage address in the memory (optionally the scratchpad memory or the scalar register file).

The Random-Vector generation instruction may be:

a Uniform distribution instruction (UNIF): according to the instruction, the device reads uniformly distributed upper and lower bound parameters, and the size and storage address of the random vector to be generated from the instruction or from the register of a memory (optionally a scratchpad memory or a scalar register file), generates the random vector that is in line with the uniform distribution in a random vector generation unit, and then writes the result of the random vector back to the specified storage address in the memory (optionally the scratchpad memory or the scalar register file); and a Gaussian distribution instruction (GAUS): according to the instruction, the device reads Gaussian distributed mean and variance parameters, and the size and storage address of the random vector to be generated from the instruction or from the register of a memory (optionally a scratchpad memory or a scalar register file), generates the random vector that is in line with the Gaussian distribution in a random vector generation unit, and then writes the result of the random vector back to the specified storage address in the memory (optionally the scratchpad memory or the scalar register file).

Figure 1B:
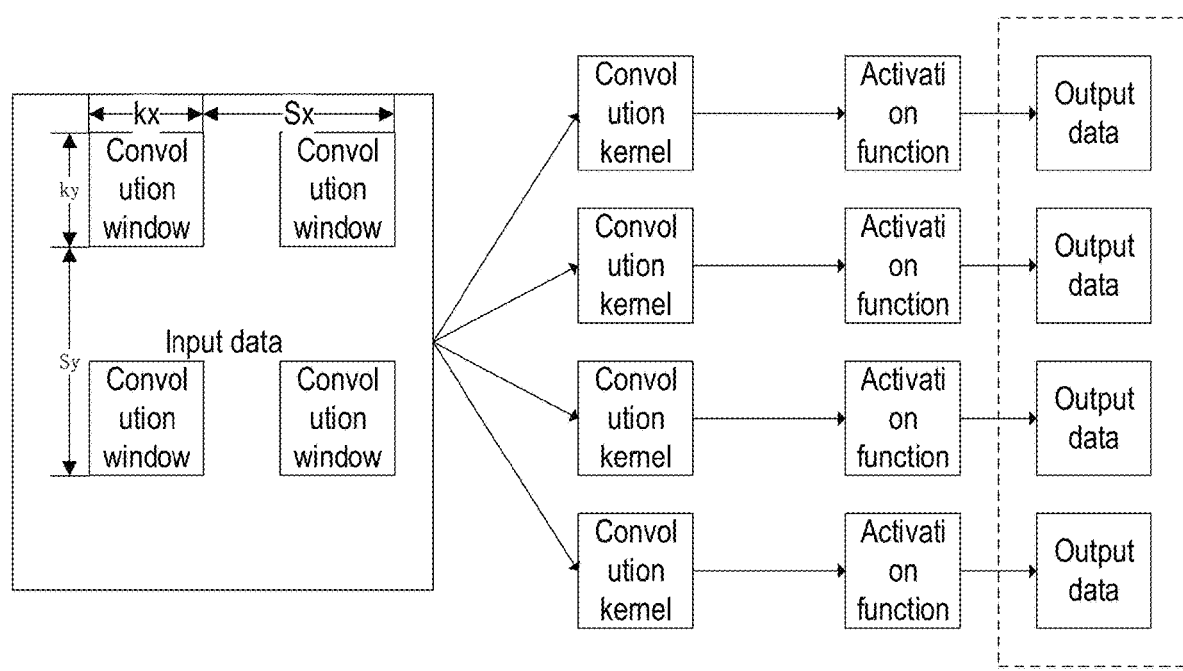
FIG. 1B is a schematic flowchart of a convolutional neural network algorithm.

During execution of a convolutional neural network algorithm (a convolution operation instruction) by the computation device shown in FIG. 1A, please refer to the flowchart of the convolutional neural network algorithm shown in FIG. 1B. As shown in FIG. 1B, a convolutional neural network includes output data, an activation function, an input data layer, and a convolution kernel.

Each computation process includes: selecting corresponding input data $x_i$ in the input data layer according to a convolution window, and then performing an addition operation on the input data and the convolution kernel. A computation process of the output data is $s=s(\Sigma wx_i+b)$ which is to multiply a convolution kernel w by input data $x_i$, find the sum, add a bias b, and then perform an activation operation s(h) to obtain a final output data s. The multiplication of the convolution kernel and the input data is a vector multiplication.

According to the size $k_x$ of the convolution kernel on an X axis and the size $k_y$ of the convolution kernel on the Y axis, the convolution window firstly selects input data of which the size is the same as that of the convolution kernel from the input data of which the size of the X axis is W and the size of the Y axis is H, performs horizontal translation and then vertical translation according to translation position vectors $S_x$ and $S_y$ of the convolution window, and traverses all the input data.

FIG. 1C shows a format of an instruction set according to an example of the present disclosure. As shown in the figure, a convolutional neural network operation instruction includes at least one opcode and at least one operation field. The opcode is for indicating a function of the convolutional neural network operation instruction. A convolutional neural network operation unit can perform a convolutional neural network operation by identifying the opcode. The operation field is for indicating data information of the convolutional neural network operation instruction. The data information may be an immediate operand or a register number (which, optionally, may be a register file), which includes a starting address and a length of input data, a starting address and a length of the convolution kernel, and a type of an activation function.

The instruction set includes: convolutional neural network COMPUTE instruction with different functions, a CONFIG instruction, an IO instruction, an NOP instruction, a JUMP instruction, and a MOVE instruction. The above operation instructions will not be further described herein. For details, please refer to related descriptions in the above examples.

Optionally, the instruction set may further include a convolution activation CONV_ACTIVATE instruction.

The convolution activation CONV_ACTIVATE instruction: according to the instruction, the device fetches input data and a convolution kernel of a specified size from a specified address in the scratchpad memory (optionally), performs a convolution operation in a convolution operation component, and then performs an activation function operation on an output result; the above-mentioned specified size may be set by the manufacturer or user.

In one example, the CONV_ACTIVATE instruction includes: a convolution operation instruction and an activation instruction. The activation instruction is configured to perform an activation function operation, and the convolution operation instruction is configured to perform a convolution operation. For details, please refer to related descriptions in the above examples.

Figure 1D:
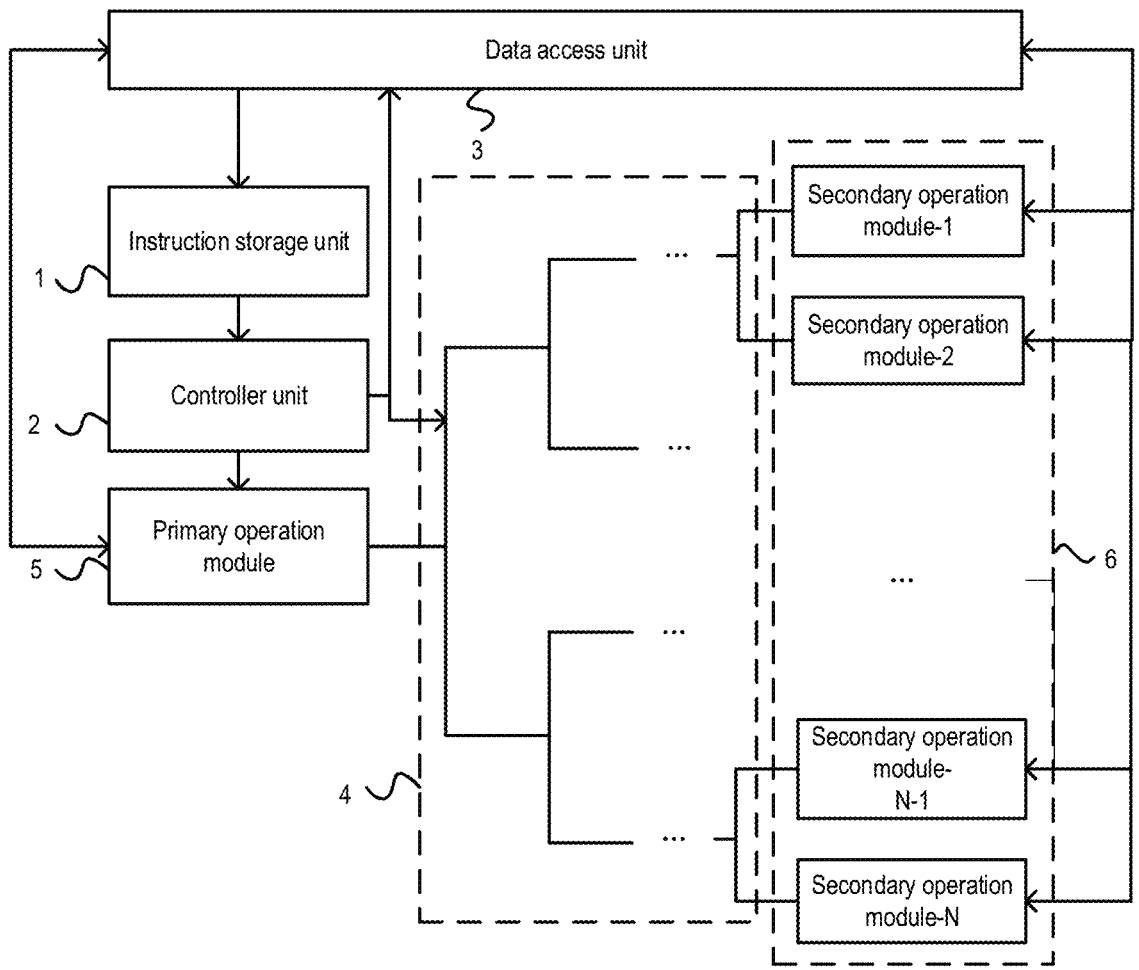
FIG. 1D is a block diagram of an overall structure of a device for performing a convolutional neural network forward operation according to an example of the present disclosure.
Figure 3:
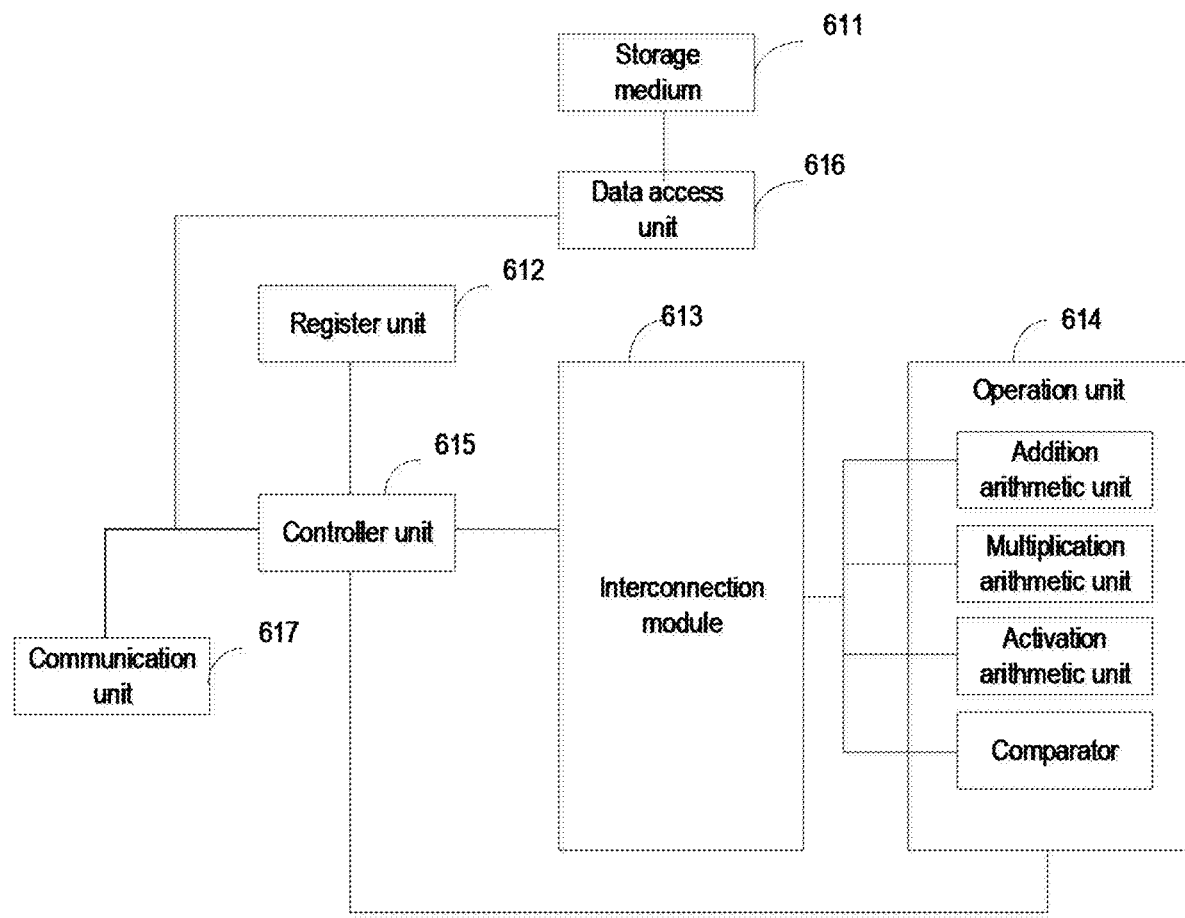
FIG. 3 is a structural diagram of another computation device according to an example of the present disclosure.

FIG. 1D is a schematic structural diagram of a device for performing a convolutional neural network forward operation according to an example of the present disclosure. As shown in FIG. 3, the device includes an instruction storage unit 1, a controller unit 2, a data access unit 3, an interconnection module 4, a primary operation module 5, and a plurality of secondary operation modules 6. The instruction storage unit 1, the controller unit 2, the data access unit 3, the interconnection module 4, the primary operation module 5, and the plurality of secondary operation modules 6 may all be realized in a form of a hardware circuit (for instance, including but not limited to FPGA, CGRA, ASIC, analog circuit, memristor, etc.).

The instruction storage unit 1 is configured to read an instruction through the data access unit 3 and store the instruction.

The controller unit 2 is configured to read an instruction from the instruction storage unit 1, decode the instruction into a control signal for controlling the behavior of other modules, and send the instruction to other modules such as the data access unit 3, the primary operation module 5, and the plurality of secondary operation modules 6.

The data access unit 3 can access an external address space, directly read and write data to each storage unit inside the device to complete the loading and storage of the data, The interconnection module 4 is configured to connect the primary operation module and the secondary operation modules, and can be implemented into different interconnection topologies (such as tree structure, ring structure, grid structure, hierarchical interconnection, bus structure, etc.).

Figure 1E:
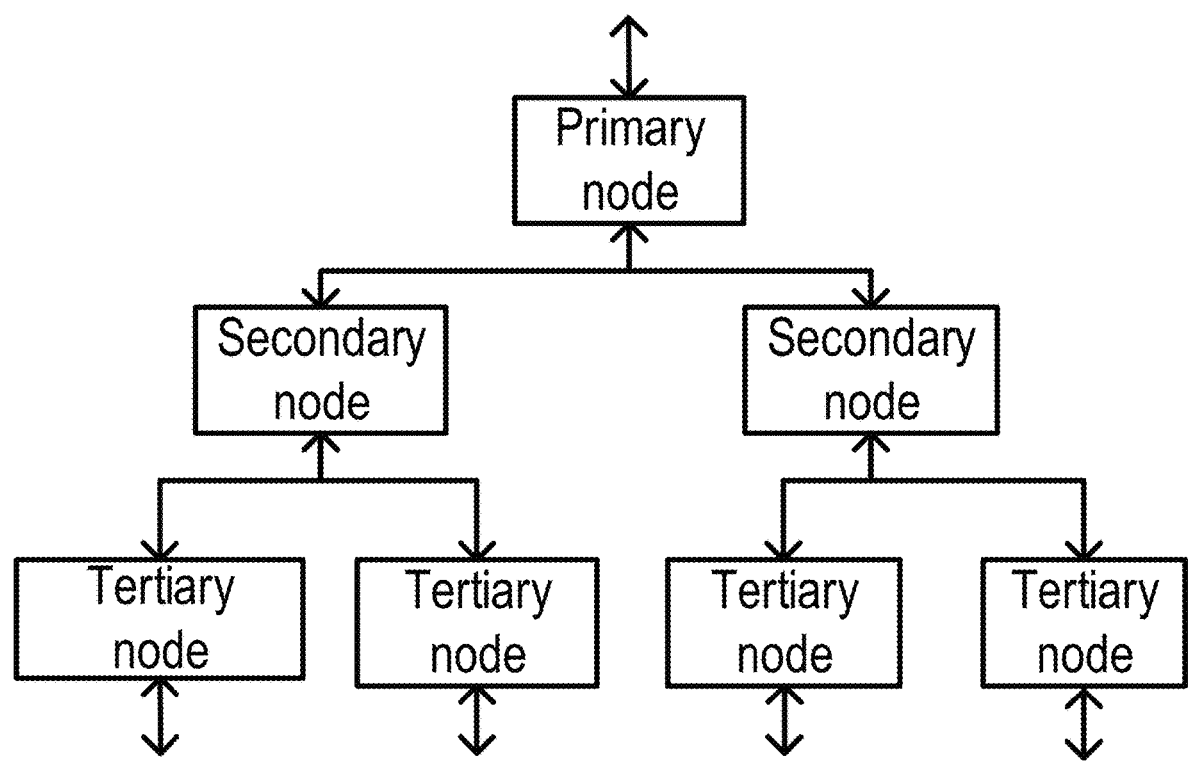
FIG. 1E is a structural diagram of an H-tree module (an implementation of an interconnection module) of a device for performing a convolutional neural network forward operation according to an example of the present disclosure.

FIG. 1E schematically shows an implementation of the interconnection module 4: an H-tree module. The interconnection module 4 forms a data path between the primary operation module 5 and the plurality of secondary operation modules 6, where the data path is a binary tree path composed of a plurality of nodes. Each node can transfer data received from an upstream node to two downstream nodes, and merge data returned by the two downstream nodes and return to an upstream node. For instance, at the beginning of a computational phase of a convolution neural network, neuron data in the primary operation module 5 is sent to each secondary operation module 6 through the interconnection module 4; when the secondary operation modules 6 finish computing, neuron values output by the respective secondary operation modules are spliced stage-by-stage into a complete vector composed of neurons in the interconnection module. For instance, if there are N secondary operation modules in the device, input data $x_i$ is transferred to the N secondary operation modules and each of the secondary operation modules performs a convolution operation on the input data $x_i$ and the convolution kernel corresponding to the secondary operation module to obtain scalar data. The scalar data of each secondary operation module are merged into an intermediate vector including N elements by the interconnection module 4. If the convolution window obtains a total of A*B pieces of (A pieces in the X direction, B pieces in the Y direction, where X and Y are coordinate axes of the three-dimensional orthogonal coordinate system) input data $x_i$ by traverse, a convolution operation is perform on the above A*B pieces of $x_i$ and all the vectors obtained are merged in the primary operation module to obtain a three-dimensional intermediate result of A*B*N.

Figure 1F:
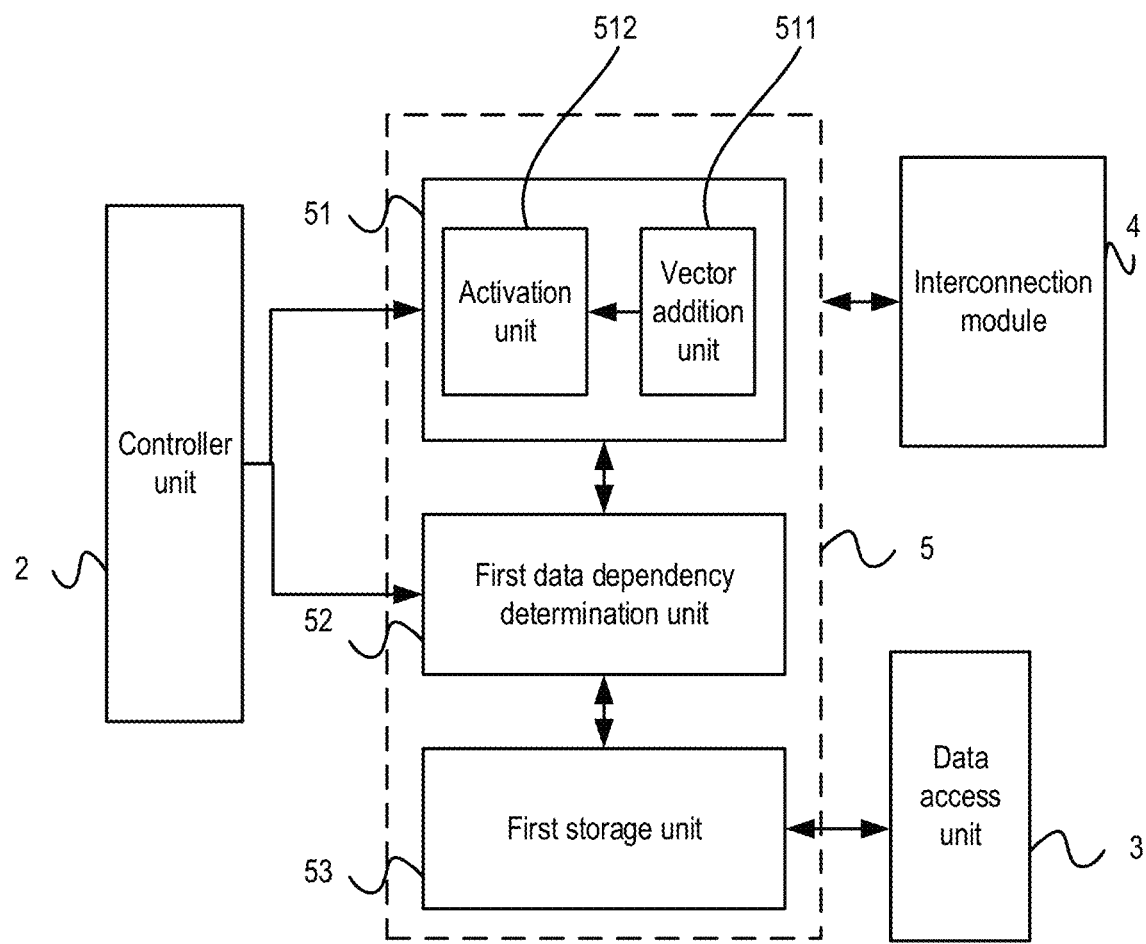
FIG. 1F is a block diagram of a structure of a primary operation module of a device for performing a convolutional neural network forward operation according to an example of the present disclosure.

FIG. 1F is a block diagram of a structure of the primary operation module 5 of a device for performing a convolutional neural network forward operation according to an example of the present disclosure. As shown in FIG. 1F, the primary operation module 5 includes a first operation unit 51, a first data dependency determination unit 52, and a first storage unit 53.

The first operation unit 51 includes a vector addition unit 511 and an activation unit 512. The first operation unit 51 is configured to receive a control signal from the controller unit and complete various operational functions of the primary operation module 5. The vector addition unit 511 is configured to perform an operation of adding a bias in the forward computation of the convolutional neural network, and perform element-wise addition on bias data and the intermediate results to obtain a bias result. The activation operation unit 512 performs an activation function operation on the bias result. The bias data may be read in from an external address space, or may be stored locally.

The data dependency determination unit 52 is a port for the first operation unit 51 to read/write the first storage unit 53, so as to ensure consistency in reading data from and writing data to the first storage unit 53. At the same time, the first data dependency determination unit 52 is also configured to send data read from the first storage unit 53 to the secondary operation modules through the interconnection module 4. Output data of the secondary operation modules 6 is directly sent to the first operation unit 51 through the interconnection module 4. An instruction output by the controller unit 2 is sent to the operation unit 51 and the first data dependency determination unit 52 to control their behavior.

The storage unit 53 is configured to cache input data and output data used by the primary operation module 5 during a computation process.

Figure 1G:
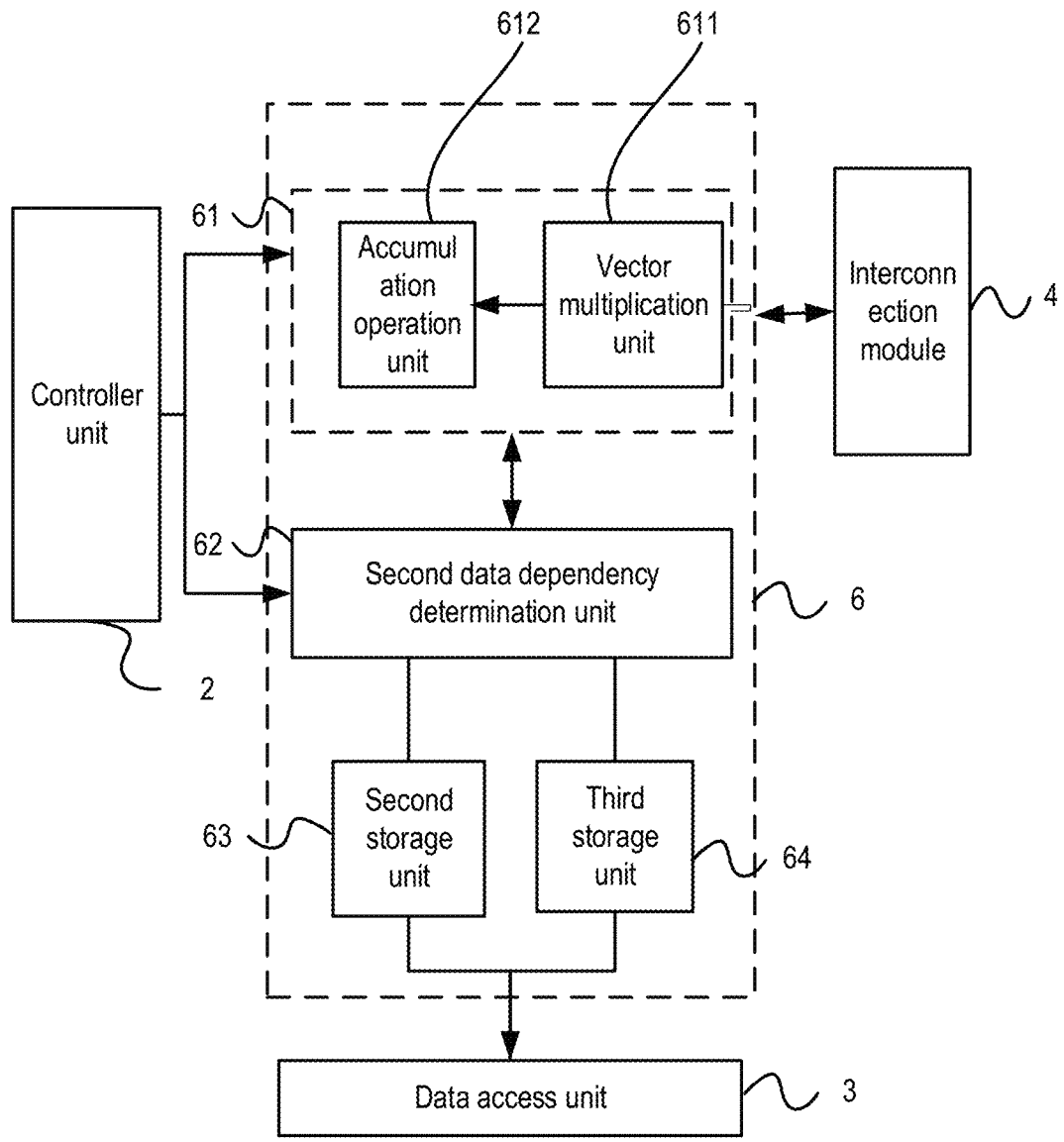
FIG. 1G is a block diagram of a structure of a secondary operation module of a device for performing a convolutional neural network forward operation according to an example of the present disclosure.

FIG. 1G is a block diagram of a structure of the secondary operation modules 6 of a device for performing a convolutional neural network forward operation according to an example of the present disclosure. As shown in FIG. 1E, each secondary operation module 6 includes a second operation unit 61, a data dependency determination unit 62, a second storage unit 63, and a third storage unit 64.

The second operation unit 61 is configured to receive a control signal from the controller unit 2 and perform a convolution operation. The second operation unit includes a vector multiplication unit 611 and an accumulation unit 612, which are respectively responsible for a vector multiplication operation and an accumulation operation in a convolution operation.

The second data dependency determination unit 62 is responsible for reading and writing the second storage unit 63 during a computation process. Before performing read/write operations, the second data dependency determination unit 62 first ensures that there is no consistency conflict between the reading and writing of data used by instructions. For instance, all control signals sent to the data dependency unit 62 are stored in the instruction queue inside the data dependency unit 62. In this queue, if a range of data to be read by a reading instruction conflicts with a range of data to be written by a writing instruction that is located at the front of the queue, the instruction can only be executed until a writing instruction depended by the instruction has been executed.

The second storage unit 63 is configured to cache input data and output scalar data of the secondary operation modules 6.

The third storage unit 64 is configured to cache convolution kernel data required by the secondary operation modules 6 in a computation process.

Figure 1H:
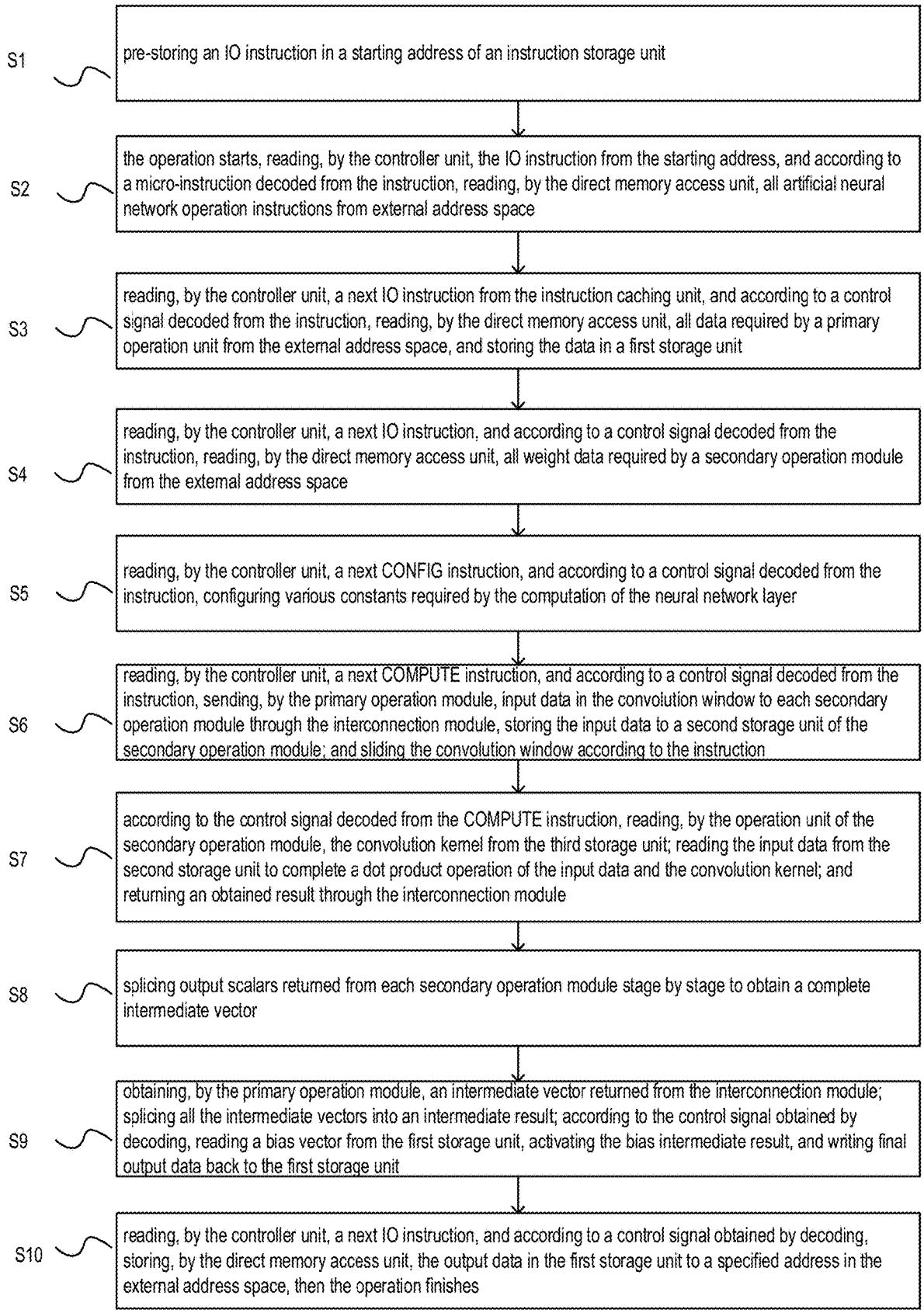
FIG. 1H is a block diagram of a process of a single-layer convolutional neural network forward operation according to an example of the present disclosure.

FIG. 1H is a flowchart of executing a convolutional neural network by a convolutional neural network operation device according to an example of the present disclosure. As shown in FIG. 1H, a process of executing the convolutional neural network neural network instruction includes:

a step S1, pre-storing an IO instruction in a starting address of the instruction storage unit 1;

a step S2, the operation starts, reading, by the controller unit 2, the IO instruction from the starting address of the instruction storage unit 1, and according to a control signal decoded from the instruction, reading, by the data access unit 3, all corresponding convolutional neural network operation instructions from an external address space, and caching the instructions in the instruction storage unit 1;

a step S3, reading, by the controller unit 2, a next IO instruction from the instruction storage unit, and according to a control signal obtained by decoding, reading, by the data access unit 3, all data (such as input data, an interpolation table for a quick activation function operation, a constant table for configuring parameters of the operation device, bias data, etc.) required by the primary operation module 5 from the external address space to the first storage unit 53 of the primary operation module 5;

a step S4, reading, by the controller unit 2, a next IO instruction from the instruction storage unit, and according to a control signal decoded from the instruction, reading, by the data access unit 3, convolution kernel data required by the secondary operation modules 6 from the external address space;

a step S5, reading, by the controller unit 2, a next CONFIG instruction from the instruction storage unit, and according to a control signal obtained by decoding, configuring, by the device, various constants required by the computation of the neural network layer; for instance, the first operation unit 51 and the second operation unit 61 may configure a value of an internal register of the parameter configuration unit in the control signal, where the parameter includes, for instance, data required by an activation function;

a step S6, reading, by the controller unit 2, a next COMPUTE instruction from the instruction storage unit, and according to a control signal decoded from the instruction, sending, by the primary operation module 5, input data in a convolution window to each secondary operation module 6 through an interconnection module and saving the input data to the second storage unit 63 of the secondary operation module 6; and then moving the convolution window according to the instruction;

a step S7, according to the control signal decoded from the COMPUTE instruction, reading, by the operation unit 61 of the secondary operation module 6, the convolution kernel from the third storage unit 64; reading the input data from the second storage unit 63 to complete the convolution operation of the input data and the convolution kernel; and returning an obtained intermediate result through the interconnection module 4;

a step S8, in the interconnection module 4, splicing intermediate results returned from respective secondary operation modules 6 stage by stage to obtain a complete intermediate vector;

a step S9, obtaining, by the primary operation module 5, the intermediate vector returned by the interconnection module 4; traversing, by the convolution window, all input data; splicing, by the primary operation module, all returned vectors into an intermediate result; according to the control signal decoded from the COMPUTE instruction, reading bias data from the first storage unit 53, adding the intermediate result and the bias data in a vector addition unit 511 to obtain a bias result; activating the bias result by the activation unit 512, and writing final output data back to the first storage unit; and a step S10, reading, by the controller unit 2, a next IO instruction from the instruction storage unit, and according to a control signal decoded from the instruction, storing, by the data access unit 3, the output data in the first storage unit 53 to a specified address in the external address space, then the operation finishes.

The implementation of a multi-layer convolutional neural network is similar to that of a single-layer convolutional neural network. After an upper layer of the convolutional neural network is executed, an operation instruction of a next layer uses an output data address of the upper layer stored in the primary operation unit as an input data address of this layer. Similarly, the address of a convolution kernel and the address of bias data in the instruction may also be changed to an address corresponding to this layer.

The present disclosure uses a device and an instruction set for performing the convolutional neural network forward operation, which solves the problem of the lack of CPU and GPU computation performance, and the problem of high front-end decoding overhead. The present disclosure effectively improves support for the forward operation of a multi-layer convolutional neural network.

By using a dedicated on-chip cache for the forward operation of a multi-layer convolutional neural network, input neurons and intermediate data may be fully reused, which may avoid repeated reading of these data from the memory, reduce the memory access bandwidth, and prevent the memory bandwidth from becoming a performance bottleneck of the forward operation of a multi-layer artificial neural network.

Figure 2:
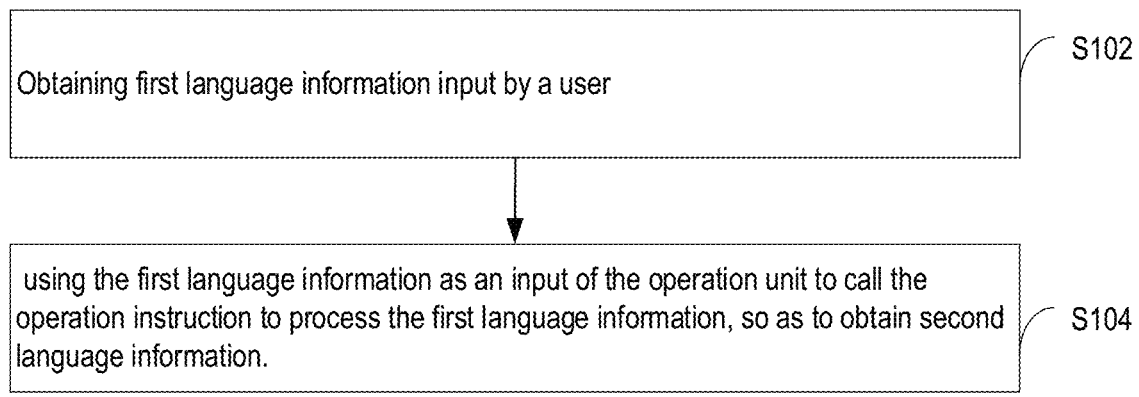
FIG. 2 is a flowchart of an information processing method according to an example of the present disclosure.

Based on the above examples, FIG. 2 shows an information processing method according to an example of the present disclosure. The method shown in FIG. 2 may include:

a step S102, obtaining, by the computation device, first language information input by a user.

The first language information is information to be processed input by a user, and the information may be text information, voice information, picture information, etc., which is not limited in the present disclosure. Furthermore, an amount of the first language information is not limited in the present disclosure.

The method further includes a step S104, using, by the computation device, the first language information as input of the operation unit to call the operation instruction to process the first language information, so as to obtain second language information, where when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side.

It should be understood that when the processing is language translation processing, the first language information is language information to be translated input by the user; when the processing is chat processing, the first language information is chat information to be replied input by the user.

The operation instruction includes, but is not limited to, a convolution operation instruction, a pooling instruction, a fully connected instruction, a batch normalization instruction, an activation softmax instruction, a normalization instruction, a non-linear activation instruction, and the like. For details, please refer to related descriptions in the above examples. Optionally, the process of calling related operation instructions in the computation device (such as an operation unit) to process the first language information will not be further described herein. For details, please refer to the specific descriptions of calling related instruction in the above examples.

Some examples involved in the present disclosure are described below.

In the step S102, the computation device may obtain first language information input by a user through the communication unit. In an optional example, the communication unit may be the storage medium (the off-chip memory) shown in 1A or be an input/output (10) unit, which is not limited herein.

In an optional example, the computation device may be the computation device shown in FIG. 1A or FIG. 1D. Specifically, the computation device can store various operation instructions in the register unit or the instruction storage unit through the data access unit; further, the computation device can read/write and store various operation instructions through the data access unit. The controller unit is configured to control the reading of various operation instructions from the register unit (or the instruction storage unit, etc.) and decode the operation instruction into an executable operation instruction. Optionally, the controller unit may also send the operation instruction to the operation unit for execution. Specifically, related arithmetic units can be called in turn for data processing according to the computation topology corresponding to the operation instruction. The convolution operation instruction is described in details below as an instance. The interconnection module is configured to receive input data (the first language information) and a computation topology, where the computation topology is a topology corresponding to the operation instruction. For instance, when the operation instruction is a convolution operation instruction, the corresponding computation topology may be: the multiplication arithmetic unit—the addition arithmetic unit—(optional) the activation arithmetic unit. Each type of arithmetic unit is configured to perform a corresponding computational function operation, for instance, the multiplication arithmetic unit is configured to perform a multiplication operation, etc., which will not be further described in the present disclosure.

Some examples involved in the step S104 are described below.

In an implementation, the computation device may call the operation instruction associated with the network model to process the first language information to obtain the second language information. The network model is composed of one or more operation instructions, and the count of the operation instructions is not limited.

In another implementation, the computation device may first call the related first operation instruction to pre-process the first language information to obtain intermediate language information conforming to a preset format. The preset format may be customized by a user side or a computation device side. For instance, the intermediate language information (intermediate language data) may be a vector of a specified length, a matrix of a specified size, a floating-point number, an integer, etc., which is not limited in the present disclosure. Further, in an implementation, the computation device may call the second operation instruction associated with the network model to process the intermediate language information to obtain the second language information.

It should be understood that the computation device calls related instructions in the network model to process the first language information (or intermediate language information), the essence of which is to determine a mapping relationship between words (mapping relationship between words in the first language information and words the second language information) to obtain and output final second language information.

It should be understood that, in practical applications, the mapping relationship between words can be implemented in any one or more of the following devices: an encoder, a decoder, a language model, an attention mechanism model, or other network models. The details are described below.

In an optional example, the network model includes, but is not limited to, a neural network model and a non-neural network model. The neural network model includes, but is not limited to, a deep neural network (DNN) model, a convolutional neural network (CNN) model, a recurrent neural network (RNN) model, a back-propagation (BP) neural network model, a long and short term memory (LSTM) network model, a gate repeat unit (GRU) model, or other neural network models, which is not limited in the present disclosure. Optionally, the neural network model may be composed of any one or more of the following functional layers: a convolution operation layer, a pooling layer, an activation softmax layer, a batch normalization layer, and a fully connected layer; where an operation of each function layers is implemented by at least one pre-stored operation instruction. In addition, a corresponding operation instruction may be designed for each functional layer in the present disclosure, so as to implement the operation in the functional layer. For instance, a fully connected instruction is designed for a fully connected layer, so as to call the fully connected layer to implement the operation of the fully connected layer; and the operation of the convolution operation layer can be implemented by the convolution operation instruction, etc.

In an optional example, the functional layers composing the neural network model, a count of the functional layers, and an order of the functional layers can be customized by a user side or a terminal side, which are not limited in the present disclosure.

Some examples involved in the step S104 are described below.

Steps of pre-processing are first introduced below. Specifically, the computation device may input the first language information into an encoder to call a related first operation instruction to encode the first language information into intermediate language information conforming to a preset format, such as encoding into a fixed-length matrix or vector. Optionally, the first language information is composed of at least one word. During the encoding process, position information may also be obtained. The position information also conforms to a preset format, which may be a position information matrix, a position information vector, and the like. The position information is used to indicate a respective position of each word in the first language information.

In an optional example, the encoder may be constructed based on a neural network model. The neural network model will not be further described herein. For details, please refer to the related introduction of the above examples. In other words, the first operation instruction involved in the pre-processing may be an operation instruction composing a neural network model.

Secondly, the mapping relationship between words (or the mapping relationship between the first language information and the second language information in the present disclosure) is introduced below. Specifically, the mapping relationship may be implemented using a neural network model or a non-neural network model. Two examples are shown below for specific description.

It should be understood that the first language information and the second language information are composed of one or more words, where the words here may include, but is not limited to, words, phrases, and the like. For some special words (such as rare words, uncommon vocabulary, etc.), the computation device may use an attention model (specifically, a neural network model) to encode these special words and determine the mapping relationship between words.

The word and the attention model (neural network model) are used as an instance below. The computation device inputs a word to be processed (or an order of each word in the first language information) into the attention model, so as to call related operation instructions in the attention model and complete related word processing such as word translation and prediction.

Specifically, the computation device may perform a specified operation, such as matrix multiplication, matrix addition, etc., on an encoded fixed-length vector (intermediate language information) and optionally a position information matrix obtained by encoding, input the same into a trained attention model such as a fully connected layer, perform a specified operation, such as matrix addition, on the same with input data previously input to the attention model after passing through the softmax layer, so as to output a probability of a plurality of corresponding candidate words and generate a search space for all candidate words in the time series.

In an optional example, the attention model may be composed of any one or more of the following functional layers: a convolution operation layer, a pooling layer, an activation softmax layer, a batch normalization layer, and a fully connected layer. An operation of each functional layer can be implemented by a corresponding operation instruction. In other words, the computation device may call a related operation instruction such as a functional instruction including a convolution operation instruction, a pooling instruction, a fully connected instruction, a batch normalization instruction, a matrix multiplication instruction, and a matrix addition instruction to implement the attention model. In the above instances, the fully connected layer and the softmax layer are only used as instances to indicate how to calculate a probability of each candidate word in the attention model, and shall not be regarded as a limitation.

Optionally, in the present disclosure, in the process of determining the mapping relationship between words, a plurality of attention models (neural network models) may be used. An arrangement and use order of the attention models may be mutual series, parallel, jump series, etc., which is not limited in this present disclosure. Optionally, an order of the functional layers used in the attention model may also be changed. For instance, the above instance may first pass through the fully connected layer before being input to the softmax layer, or pass through the softmax layer first before being input to the fully connected layer, which is not limited in the present disclosure.

For instance, in the language translation process, the computation device inputs Chinese words "我是" into the attention model, and outputs a vocabulary formed by all the candidate words in the second language information, where the vocabulary includes a probability (score) of each candidate word. In the above instance, the Chinese word "我" is translated into English correspondingly, and the vocabulary includes: "the probability of 'I' is 0.8", "the probability of 'me' is 0.15", and "the probability of 'we' is 0.05"; the Chinese word "是" is correspondingly translated into English, and the vocabulary includes: "the probability of 'am' is 0.85", "the probability of 'be' is 0.05", "the probability of 'is' is 0.05", and "the probability of 'are' is 0.05".

The word and the language model are used as another instance below. The language model is a non-neural network model. Specifically, the language model includes priori knowledge, where the priori knowledge at least includes mapping relationships between each word in the first language information and a plurality of words composing the second language information. Correspondingly, the computation device can input the first language information or the intermediate language information (a vector of a fixed length) into the language model, iteratively look up probabilities (scores) of all candidate words, and then generate a search space for all candidate words on the time series after finishing the iterative looking up.

Finally, a determination process of the second language information is introduced below.

Specifically, after obtaining the probability of each candidate word in the vocabulary, the computation device may generate a search space for all candidate words in a time series, where the search space includes a plurality of language information generated according to the time series. In the above instance of "I am", the search space may include a plurality of language information as follow: "I am", "I is", "I are", "I be", "me am", "me is", "me are", "me be".

Further, the computation device may also look up second language information from a plurality of language information. Specifically, the computation device may call a related second operation instruction in the decoder to calculate a respective score of each language information, and select language information whose score exceeds a preset threshold as the second language information and output the language information. An amount of the second language information is not limited in the present disclosure. The second operation instruction may be an operation instruction associated with a sorting algorithm. In other words, the computation device may call a related second operation instruction to implement a sorting algorithm such as a beam search, an A* algorithm, a WFST algorithm, an n-gram algorithm, etc., and the sorting algorithm is not limited in the present disclosure.

For the second operation instruction, please refer to related introductions in the examples described in FIG. 1. For instance, the computation device may use a combination of a vector multiplication instruction, a vector addition instruction, a scalar digital logic instruction, and other operation instructions to implement the beam search, A* algorithm, WFST algorithm, and n-gram algorithm, etc.

In an optional example, the computation device may display the second language information on a terminal display interface in real time or periodically for a user to view. Optionally, the second language information may be several pieces (such as 5 pieces) of language information with higher scores selected by the computation device from a plurality of language information for display.

It should be noted that, in practical applications, the specific implementation processes involved in this present disclosure, such as pre-processing, a mapping relationship between words, and the determination of second language information, can be set in any one or more of the following devices to obtain processed second language information: an encoder, a decoder, a language model, an attention model, or other network models, which are not limited herein.

In an optional example, a specific implementation of the step S104 is briefly described below combined with the above examples.

In a specific implementation, the computation device fetches a corresponding operation instruction from the register unit (or the instruction storage unit) through the controller unit and the data access unit, where the operation instruction is configured to process the first language information (which may specifically be language translation processing or chat prediction processing). For the operation instruction, please refer to the related introduction in the above examples; for instance, the instruction may be the operation instruction associated with a network model. The count of the operation instructions is not limited herein.

Further, after the controller unit fetches the operation instruction, the controller unit sends the operation instruction to the operation unit to process the first language information in the operation unit according to the computation topology corresponding to the operation instruction, so as to obtain the second language information.

A specific implementation process of the step S104 is described in detail below with the operation instruction being a convolution operation instruction as an instance.

In a specific implementation, referring to the computation device shown in FIG. 1A, The computation device obtains first language information input by a user through the communication unit (or a storage medium, an off-chip memory). Optionally, the computation device may call a related computation instruction to perform conversion of a preset format on the first language information, thereby obtaining language information which can be identified and processed by the computation device, such as a vector composed of i pieces of $x_i$ language data. The preset format is customized by the user side or the computation device side. Further, the computation device fetches a convolution operation instruction from the register unit through the data access unit and the controller unit, and sends the convolution operation instruction to the operation unit for execution, in other words, a formula to be executed is $s=s(\Sigma wx_i+b)$ is convolution kernel, and $x_i$ is input data. Correspondingly, the computation device controls the operation unit to execute the convolution operation instruction on the input data $x_i$ (first language information). Specifically, the computation device calls the multiplication arithmetic unit in the operation unit to multiply a convolution kernel w by input data $x_i$, calls the addition arithmetic unit to find the sum, adds a bias b, and then calls the activation arithmetic unit to perform an activation operation s(h) so as to obtain a final output result s. The output result is the second language information or intermediate language information. When the output result is intermediate language information, according to a similar computation principle of the above convolution operation instruction, the computation device may further call other operation instructions to process the intermediate language information. The process is repeated until the second language information is obtained.

In another specific implementation, referring to the computation device shown in FIG. 1D, the process is similar to that of the above step S104 and uses the computation device shown in 1D. The operation unit may specifically include a primary operation module, secondary operation modules, and an interconnection module connecting the primary operation module and the secondary operation modules. The interconnection module may be configured to transfer data between the primary operation module and the secondary operation modules, receive a computation topology corresponding to an operation instruction, etc. The computation device may control a implementation of a bias b operation and an activation S (h) operation in the convolution operation in the primary operation module, and control a implementation of a vector multiplication operation $wx_i$ and an accumulation operation $\Sigma$ in the respective secondary operation modules. Specifically, the computation device may transfer input data $x_i$ (the first language information) to each secondary operation module through the controller unit, so as to first call a multiplication arithmetic unit to multiply a convolution kernel w by the input data $x_i$, and then call an addition arithmetic unit to sum and obtain an output scalar. Then the interconnection module is configured to accumulate and splice output scalars of the respective secondary operation modules stage by stage into an intermediate vector and send the intermediate vector to the primary operation module. Further, the computation device calls the addition arithmetic unit in the primary operation module to splice intermediate vectors corresponding to all input data into an intermediate result, adds a bias b to the intermediate result, and then calls an activation arithmetic unit to perform an activation operation s(h) to obtain a final output result s.

For the implementation of calling related operation instructions in the computation device to process the first language information, please refer to related descriptions of the above FIGS. 1A to 1H. In other words, the examples of the FIGS. 1A to 1H may also be correspondingly applied to the examples of the information processing method described in FIG. 2, and will not be further described herein. It should be understood that the convolution operation instruction in the above description is only used as an instance to illustrate the call and data processing of the convolution operation instruction, which is not a limitation; accordingly, when the operation instruction is another instruction instead of the convolution operation instruction, a related processing method similar to that of the convolution operation instruction may also be used to implement steps of the method examples of the present disclosure.

FIG. 3 is a structural diagram of a computation device (which may specifically be a terminal device) according to an example of the present disclosure. The computation device shown in FIG. 3 includes a communication unit 617 and an operation unit 614, where the communication unit 617 is configured to obtain first language information input by a user;

the operation unit 614 is configured to call an operation instruction to process the first language information to obtain second language information; where when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side.

Optionally, the computation device further includes a storage medium 611 (optional), a register unit 612, an interconnection module 614, a controller 615, and a data access unit 616. For the above function units, please refer to related descriptions of the above examples. Optionally, the communication unit and the storage medium may be the same or different. For instance, the communication unit may be a storage medium or be an (IO) unit of the computation device, which is not limited herein.

In an optional example, the computation device further includes a register unit 612 and a controller unit 615, where the register unit is configured to store various operation instructions and computation topologies corresponding to the operation instructions;

the controller unit is configured to fetch an operation instruction from the register unit, decode the operation instruction into an executable operation instruction, and send the operation instruction and a computation topology corresponding to the operation instruction to the operation unit; and the operation unit is configured to call the operation instruction to process the first language information to obtain second language information.

In an optional example, the controller unit is configured to fetch an operation instruction associated with a network model from the register unit, decode the operation instruction into an executable operation instruction, and send the operation instruction to the operation unit;

the operation unit is configured to call the operation instruction to process the first language information to obtain second language information.

In an optional example, the operation instruction includes a first operation instruction and a second operation instruction, the controller unit is configured to fetch the first operation instruction and the second operation instruction associated with a network model from the register unit;

the operation unit is configured to call the first operation instruction to pre-process the first language information to obtain intermediate language information conforming to a preset format, where the preset format at least includes: a vector of a specified length;

the operation unit is configured to call the operation instruction to process the first language information to obtain second language; where the network model includes a preset neural network model or a preset non-neural network model.

In an optional example, when the network model is a neural network model, the neural network model includes any one or more of the following functional layers: a convolution operation layer, a pooling layer, an activation softmax layer, a batch normalization batch normalization layer, and a fully connected layer; where the function layers are composed of at least one pre-stored operation instruction.

In an optional example, the functional layers composing the neural network model, a count of the functional layers, and an order of the functional layers are customized by a user side or a terminal side.

In an optional example, the computation device further includes a data access unit and a storage medium, the operation unit is further configured to send the second language information to the data access unit and store the second language information in the storage medium.

In an optional example, the operation unit includes a primary operation module and a plurality of secondary operation modules, where the primary operation module is interconnected with the plurality of secondary operation modules by an interconnection module, and when the operation instruction is a convolution operation instruction, the secondary operation modules are configured to implement a convolution operation of input data and convolution kernels in a convolutional neural network algorithm, wherein the input data is the first language information and the convolutional neural network algorithm corresponds to the convolution operation instruction, the interconnection module is configured to implement data transfer between the primary operation module and the secondary operation modules; before a forward operation of a neural network fully connected layer starts, the primary operation module sends the input data to each secondary operating through the interconnection module; and after the computation of the secondary operation modules is completed, the interconnection module splices output scalars of the respective secondary operation modules stage by stage into an intermediate vector and sends the intermediate vector back to the primary operation module, and the primary operation module is configured to splice intermediate vectors corresponding of all input data into an intermediate result for subsequent operations, so as to obtain the second language information.

In an optional example, the primary operation module is configured to add bias data to the intermediate result, and then perform an activation operation.

In an optional example, the primary operation module includes a first operation unit, where the first operation unit includes a vector addition unit and an activation unit, the vector addition unit is configured to implement a bias addition operation of a convolutional neural network operation and perform element-wise addition on bias data and the intermediate result to obtain a bias result; and the activation unit is configured to perform an activation function operation on the bias result.

In an optional example, the primary operation module includes a first storage unit, a first operation unit, a first data dependency determination unit, and a first storage unit; where the first storage unit is configured to cache input data and output data used by the primary operation module during a computation process, where the output data includes the second language information;

the first operation unit is configured to perform various operational functions of the primary operation module, The data dependency determination unit is configured to ensure that there is no consistency conflict in reading data from and writing data to the first storage unit, read an input neuron vector from the first storage unit, and send the vector to the secondary operation modules through the interconnection module; and sending an intermediate result vector from the interconnection module to the first operation unit.

In an optional example, the secondary operation modules include a second operation unit, where the second operation unit includes a vector multiplication unit and an accumulation unit, the vector multiplication unit is configured to perform a vector multiplication operation of a convolution operation, and the accumulation unit is configured to perform an accumulation operation of the convolution operation.

In an optional example, each secondary operation module includes a second operation unit, a second data dependency determination unit, a second storage unit, and a third storage unit;

the second operation unit is configured to perform various arithmetic and logical operations of the secondary operation modules, the second data dependency determination unit is configured to perform a reading/writing operation on the second storage unit and the third storage unit during a computation process to ensure that there is no consistency conflict between the reading and writing operations on the second storage unit and the third storage unit, the second storage unit is configured to cache input data and an output scalar obtained from the computation performed by the secondary operation module, and the third storage unit is configured to cache a convolution kernel required by the secondary operation module in the computation process.

In an optional example, the first data dependency or the second data dependency ensures that there is no consistency conflict in reading and writing in the following manners: storage addresses corresponding to data/instructions stored in the corresponding storage unit do not overlap; or determining whether there is dependency between a control signal that has not been executed and data of a control signal that is being executed; if there is no dependency, the control signal is allowed to be issued immediately; otherwise, the control signal is not allowed to be issued until all control signals on which the control signal is dependent have been executed; where the computation device controls the controller unit to obtain an operation instruction from the register unit and decode the operation instruction into the control signal for controlling behavior of other modules, wherein the other modules include the primary operation module and the plurality of of secondary operation modules.

In an optional example, the plurality of secondary operation modules are configured to compute respective output scalars in parallel by configuration using the same input data and respective convolution kernels.

In an optional example, an activation function active used by the primary operation module may be any of the following non-linear functions: sigmoid, tanh, relu, softmax, or may be a linear function.

In an optional example, the interconnection module forms a data channel for continuous or discrete data between the primary operation module and the plurality of secondary operation modules. The interconnection module has any of the following structures: a tree structure, a ring structure, a grid structure, a hierarchical interconnection, and a bus structure.

For those parts which are not shown or described in the examples of the present disclosure, please refer to related descriptions of the above examples.

An example of the present disclosure further provides a computer storage medium on which a computer program is stored for electronic data exchange. The computer program may cause a computer to perform part or all of the steps of any information processing method described in the foregoing method examples.

An example of the present disclosure further provides a computer program product, where the computer program product includes a non-transitory computer-readable storage medium storing a computer program. The computer program may cause a computer to perform part or all of the steps of any information processing method described in the foregoing method examples.

An example of the present disclosure also provides an acceleration device which includes: a memory which stores executable instructions, and a processor configured to execute the executable instructions in the storage unit according to the information processing method.

The processing unit may be a single one, or may include two or more processing units. In addition, the processor may also include a general-purpose processor (CPU) or a graphics processing unit (GPU), a field programmable gate array (FPGA), or an application-specific integrated circuit (ASIC) to set up and operate a neural network. The processor may also include an on-chip memory for caching (including a memory in the processing device).

In some examples, the present disclosure provides a chip which includes the above neural network processor configured to execute the information processing method.

In some examples, the present disclosure provides a chip package structure which includes the above chip.

In some examples, the present disclosure provides a board card which includes the above chip package structure.

In some examples, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be noted that, the foregoing examples of method, for the sake of conciseness, are all described as a series of action combinations, but those skilled in the art should know that since according to the present disclosure, the steps may be performed in a different order or simultaneously, the disclosure is not limited by the described order of action. Secondly, Those skilled in the art should also understand that the examples described in the specification are all optional, and the actions and modules involved are not necessarily required for this disclosure.

In the examples above, the description of each example has its own emphasis. For a part that is not described in detail in one example, reference may be made to related descriptions in other examples.

It should be understood that in the examples provided by the present disclosure, the disclosed device may be implemented in another manner. For instance, the examples above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the examples of the present disclosure.

In addition, the functional units in each example of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

A person of ordinary skill in the art may understand that all or part of the steps of the foregoing examples of method may be completed by a program instructing related hardware. The program may be stored in a computer-readable memory, and the memory may include a flash disk, a read-only memory (ROM), a random access memory (RAM), a magnetic disk, an optical disk, or the like.

The examples of the present disclosure have been described in detail above. Specific examples have been used in the specification to explain the principles and implementation manners of the present disclosure. The descriptions of the above examples are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

What is claimed:

1. An information processing method applied to a computation circuit, wherein the computation circuit comprises a communication circuit and an operation circuit, and the method comprises:
   controlling, by the computation circuit, the communication circuit to obtain first language information input by a user;
   controlling, by the computation circuit, the operation circuit to obtain and call an operation instruction to process the first language information to obtain second language information, wherein
   when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side,
   wherein the operation circuit includes a primary operation module and a plurality of secondary operation modules, wherein the primary operation module is interconnected with the plurality of secondary operation modules by an interconnection module, and when the operation instruction is a convolution operation instruction,
   the calling the operation instruction to process the first language information includes:
   controlling, by the computation circuit, the secondary operation modules to implement a convolution operation of input data and a convolution kernel in a convolutional neural network algorithm, wherein the input data is the first language information and the convolutional neural network algorithm corresponds to the convolution operation instruction,
   controlling, by the computation circuit, the interconnection module to implement data transfer between the primary operation module and the secondary operation modules, before a forward operation of a neural network fully connected layer starts, transferring, by the primary operation module, the input data to each secondary operation module through the interconnection module, and after the computation of the secondary operation modules is completed, splicing, by the interconnection module, output scalars of the respective secondary operation modules stage by stage to obtain an intermediate vector, and sending the intermediate vector back to the primary operation module,
   controlling, by the computation circuit, the primary operation module to splice intermediate vectors corresponding of all input data into an intermediate result for subsequent operations, so as to obtain the second language information, and
   controlling, by the computation circuit, the primary operation module to add bias data to the intermediate result, and then performing an activation operation.

2. The method of claim 1, wherein the computation circuit further includes a register circuit and a controller circuit, and the controlling, by the computation circuit, the operation circuit to obtain and call an operation instruction to process the first language information includes:
   controlling, by the computation circuit, the controller circuit to fetch an operation instruction associated with a network model from the register circuit, and sending, by the computation circuit, the operation instruction to the operation circuit, and
   controlling, by the computation circuit, the operation circuit to call the operation instruction to process the first language information to obtain second language information.

3. The method of claim 1, wherein the operation instruction includes a first operation instruction and a second operation instruction, the computation circuit further includes a register circuit and a controller circuit, and the controlling, by the computation circuit, the operation circuit to call the operation instruction to process the first language information includes:
   controlling, by the computation circuit, the controller circuit to fetch a first operation instruction and a second operation instruction associated with a network model from the register circuit, and sending the first operation instruction and the second operation instruction to the operation circuit,
   controlling, by the computation circuit, the operation circuit to call the first operation instruction to pre-process the first language information to obtain intermediate language information conforming to a preset format, wherein the preset format at least includes: a vector of a specified length,
   controlling, by the computation circuit, the operation circuit to call the second operation instruction associated with the network model to process the intermediate language information to obtain the second language information, wherein
   the network model includes a preset neural network model or a preset non-neural network model.

4. The method of claim 3, wherein when the network model is a neural network model, the neural network model includes any one or more of the following functional layers: a convolution operation layer, a pooling layer, an activation softmax layer, a batch normalization layer, and a fully connected layer, wherein an operation of the convolution operation layer is implemented through a convolution operation instruction, an operation of the pooling layer is implemented through a pooling instruction, an operation of the activation layer is implemented through an activation instruction, an operation of the batch normalization layer is implemented through the batch normalization instruction, and an operation of the fully connected layer is implemented through a fully connected instruction.

5. The method of claim 4, wherein functional layers composing the neural network model, a count of the functional layers, and an order of the functional layers are customized by a user side or a terminal side.

6. The method of claim 1, wherein the computation circuit further includes a data access circuit and a storage medium, and
the computation circuit controls the operation circuit to send the second language information to the data access circuit and store the second language information in the storage medium.

7. The method of claim 1, wherein the primary operation module includes a first operation circuit, wherein the first operation circuit includes a vector addition circuit and an activation circuit,
the controlling, by the computation circuit, the primary operation module to add bias data to the intermediate result, and then performing an activation operation include:
controlling, by the computation circuit, the vector addition circuit to implement a bias addition operation of a convolutional neural network operation and perform element-wise addition on bias data and the intermediate result to obtain a bias result, and
controlling, by the computation circuit, the activation circuit to perform an activation function operation on the bias result.

8. The method of claim 1, wherein each secondary operation module includes a second operation circuit, wherein the second operation circuit includes a vector multiplication circuit and an accumulation circuit,
the controlling, by the computation circuit, the secondary operation modules to perform a convolution operation of input data and a convolution kernel in a convolutional neural network algorithm includes:
controlling, by the computation circuit, the vector multiplication circuit to perform a vector multiplication operation of the convolution operation, and
controlling, by the computation circuit, the accumulation circuit to perform an accumulation operation of the convolution operation.

9. The method of claim 1, wherein the computation circuit controls the plurality of secondary operation modules to compute respective output scalars in parallel by using the same input data and respective convolution kernels.

10. A computation circuit, comprising a communication circuit and an operation circuit, wherein
the communication circuit is configured to obtain first language information input by a user;
the operation circuit is configured to obtain and call an operation instruction to process the first language information to obtain second language information, wherein
when the processing is language translation processing, an applied language corresponding to the second language information is different from an applied language corresponding to the first language information; when the processing is chat prediction processing, the second language information is chat feedback information obtained by predicting the first language information; and the operation instruction is an instruction for language processing preset by a user side or a terminal side,
wherein the operation circuit includes a primary operation module and a plurality of secondary operation modules, wherein the primary operation module is interconnected with the plurality of secondary operation modules by an interconnection module, and when the operation instruction is a convolution operation instruction,
the secondary operation modules are configured to implement a convolution operation of input data and a convolution kernel in a convolutional neural network algorithm, wherein the input data is the first language information and the convolutional neural network algorithm corresponds to the convolution operation instruction,
the interconnection module is configured to implement data transfer between the primary operation module and the secondary operation modules, before a forward operation of a neural network fully connected layer starts, the primary operation module sends the input data to each secondary operation module through the interconnection module, and after the computation of the secondary operation modules is completed, the interconnection module splices output scalars of the respective secondary operation modules stage by stage into an intermediate vector and sends the intermediate vector back to the primary operation module, and
the primary operation module is configured to splice intermediate vectors corresponding to all input data into an intermediate result, and perform subsequent operations on the intermediate result, wherein
the primary operation module is configured to add bias data to the intermediate result, and then perform an activation operation.

11. The computation circuit of claim 10, further comprising a register circuit and a controller circuit, wherein
the controller circuit is configured to fetch an operation instruction associated with a network model and send the operation instruction to the operation circuit, and the operation circuit is configured to call the operation instruction to process the first language information to obtain second language information, or
the controller circuit is configured to fetch a first operation instruction and a second operation instruction associated with a network model from the register circuit, and send the first operation instruction and the second operation instruction to the operation circuit, and the operation circuit is configured to call the first operation instruction to pre-process the first language information to obtain intermediate language information conforming to a preset format, wherein the preset format at least includes: a vector of a specified length, and the operation circuit is further configured to call the second operation instruction associated with the network model to process the intermediate language information to obtain the second language information, wherein the network model includes a preset neural network model or a preset non-neural network model.

12. The computation circuit of claim 10, wherein the primary operation module includes a first operation circuit, wherein the first operation circuit includes a vector addition circuit and an activation circuit,
the vector addition circuit is configured to implement a bias addition operation of a convolutional neural network operation and perform element-wise addition on bias data and the intermediate result to obtain a bias result, and
the activation circuit is configured to perform an activation function operation on the bias result, and
wherein each secondary operation module includes a second operation circuit, wherein the second operation circuit includes a vector multiplication circuit and an accumulation circuit, the vector multiplication circuit is configured to perform a vector multiplication operation of a convolution operation, and the accumulation circuit is configured to perform an accumulation operation of the convolution operation.

13. The computation circuit of claim 10, wherein the plurality of secondary modules use the same input data and respective convolution kernels to compute respective output scalars in parallel.

* * * * *